United States Patent
Niwa et al.

(10) Patent No.: US 9,446,976 B2
(45) Date of Patent: Sep. 20, 2016

(54) MOLTEN GLASS CONVEYING EQUIPMENT ELEMENT, METHOD FOR MANUFACTURING MOLTEN GLASS CONVEYING EQUIPMENT ELEMENT, GLASS MANUFACTURING APPARATUS COMPRISING MOLTEN GLASS CONVEYING EQUIPMENT ELEMENT AND METHOD FOR MANUFACTURING GLASS PRODUCT

(71) Applicant: ASAHI GLASS COMPANY, LIMITED, Tokyo (JP)

(72) Inventors: Akifumi Niwa, Tokyo (JP); Hitoshi Igarashi, Tokyo (JP); Keiji Hori, Tokyo (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/707,719

(22) Filed: May 8, 2015

(65) Prior Publication Data

US 2015/0239765 A1    Aug. 27, 2015

Related U.S. Application Data

(63) Continuation of application No. PCT/JP2013/080084, filed on Nov. 7, 2013.

(30) Foreign Application Priority Data

Nov. 12, 2012 (JP) .................... 2012-248210

(51) Int. Cl.
C03B 5/42 (2006.01)
C03B 7/08 (2006.01)
(Continued)

(52) U.S. Cl.
CPC ............... *C03B 5/43* (2013.01); *C03B 5/425* (2013.01); *C04B 14/005* (2013.01);
(Continued)

(58) Field of Classification Search
CPC ........ C03B 5/43; C03B 5/425; C04B 14/005; C04B 35/48; C04B 35/481; C04B 35/482
See application file for complete search history.

(56) References Cited

U.S. PATENT DOCUMENTS 2,656,278 A * 10/1953 Ballard ................... C04B 35/46
                                                            193/15
3,076,716 A *  2/1963 Hathaway, III ........ C01G 25/02
                                                            501/103
(Continued)

FOREIGN PATENT DOCUMENTS

EP    1810956 A1    7/2007
EP    2735550 A1    5/2014
(Continued)

OTHER PUBLICATIONS

International Search Report issued Feb. 4, 2014 in PCT/JP2013/080084 filed Nov. 7, 2013 (w/ English translation).

*Primary Examiner* — Jodi C Franklin

(74) *Attorney, Agent, or Firm* — Oblon, McClelland, Maier & Neustadt, L.L.P.

(57) ABSTRACT

A method for producing a molten glass conveying equipment element. The molten glass conveying equipment element has a conduit structure for molten glass containing at least one conduit comprising platinum or a platinum alloy, a first ceramic structure provided around the conduit and a second ceramic structure located around the first ceramic structure. The method includes filling a gap between the conduit and the second ceramic structure with a slurry body, and sintering the slurry body at a temperature of 1,300 to 1,550° C., thereby forming the first ceramic structure. The slurry body is prepared by blending specific first particles, specific second particles and specific third particles with specific mass ratios.

24 Claims, 11 Drawing Sheets

(51) Int. Cl.
*C03C 3/093* (2006.01)
*C03B 5/43* (2006.01)
*C03B 5/425* (2006.01)
*C04B 35/482* (2006.01)
*C04B 14/00* (2006.01)
*C04B 111/00* (2006.01)

(52) U.S. Cl.
CPC ... *C04B 35/482* (2013.01); *C04B 2111/00706* (2013.01); *C04B 2235/3225* (2013.01); *C04B 2235/3229* (2013.01); *C04B 2235/3418* (2013.01); *C04B 2235/5427* (2013.01); *C04B 2235/5472* (2013.01); *C04B 2235/9607* (2013.01)

(56) References Cited

U.S. PATENT DOCUMENTS

| | | | | |
|---|---|---|---|---|
| 3,303,033 A | * | 2/1967 | La Grange | C04B 35/46 501/103 |
| 3,793,041 A | * | 2/1974 | Sowman | C04B 35/48 501/103 |
| 4,010,039 A | * | 3/1977 | de Aza | C04B 35/48 501/104 |
| 4,070,286 A | * | 1/1978 | Iler | B01J 13/02 210/198.2 |
| 4,142,022 A | * | 2/1979 | Erickson | B32B 7/04 156/91 |
| 4,530,884 A | * | 7/1985 | Erickson | B32B 7/04 123/193.6 |
| 4,772,511 A | * | 9/1988 | Wood | C01G 25/02 404/93 |
| 5,204,298 A | * | 4/1993 | Yaoi | B22D 41/02 501/104 |
| 5,502,012 A | * | 3/1996 | Bert | B02C 17/20 501/103 |
| 5,863,850 A | * | 1/1999 | Nawa | C04B 35/119 501/103 |
| 6,087,285 A | * | 7/2000 | Oomichi | C04B 35/486 501/103 |
| 2009/0131241 A1 | * | 5/2009 | Godard | C03B 17/064 501/106 |
| 2010/0292522 A1 | * | 11/2010 | Chun | C04B 35/488 585/648 |
| 2013/0203324 A1 | * | 8/2013 | Hasegawa | B24B 1/00 451/41 |
| 2015/0315441 A1 | * | 11/2015 | Haerle | B24B 37/044 252/79.1 |

FOREIGN PATENT DOCUMENTS

| | | |
|---|---|---|
| JP | 2002-087826 A | 3/2002 |
| WO | WO 2004/101466 A1 | 11/2004 |
| WO | WO 2010/067669 A1 | 6/2010 |
| WO | WO 2013/011927 A1 | 1/2013 |

* cited by examiner

MOLTEN GLASS CONVEYING EQUIPMENT ELEMENT, METHOD FOR MANUFACTURING MOLTEN GLASS CONVEYING EQUIPMENT ELEMENT, GLASS MANUFACTURING APPARATUS COMPRISING MOLTEN GLASS CONVEYING EQUIPMENT ELEMENT AND METHOD FOR MANUFACTURING GLASS PRODUCT

TECHNICAL FIELD

The present invention relates to a molten glass conveying equipment element that can be suitable used in a glass manufacturing apparatus such as a vacuum degassing apparatus, a method for producing a molten glass conveying equipment element, a glass manufacturing apparatus containing the molten glass conveying equipment element, and a method for producing a glass article.

BACKGROUND ART

It is required in a glass manufacturing apparatus such as a vacuum degassing apparatus that a constituent material of a conduit for molten glass is excellent in heat resistance and corrosion resistance to molten glass. Platinum or a platinum alloy is used as a material satisfying the requirement (Patent Document 1). An insulating brick is arranged around a conduit for molten glass made of platinum or a platinum alloy so as to surround the conduit.

The platinum or platinum alloy constituting the conduit, and the insulating brick arranged around the conduit have different coefficient of thermal expansion. Therefore, the difference in the amount of thermal expansion when heating and the difference in the amount of shrinkage when cooling become the problem.

To absorb the difference in the amount of thermal expansion when heating or the difference in the amount of shrinkage when cooling, unshaped ceramic material such as castable cement is filled between the conduit and the insulating brick so that those can slightly move relatively when the temperature change has occurred.

The present inventors have found that the filling with unshaped ceramic material may not absorb the difference in the amount of thermal expansion when heating or the difference in the amount of shrinkage when cooling, depending on the arrangement of the conduit for molten glass. For example, the difference in the amount of thermal expansion when heating or the difference in the amount of shrinkage when cooling cannot be absorbed by unshaped ceramic material at the junction between a vertical pipe and a horizontal pipe, and cracks are likely to occur at the junction. If cracks occur at the junction, there is a problem that an insulating brick arranged around the conduit is corroded by molten glass leaked from the cracks. This gives rise to the problems such that productivity is decreased due to repair work and the life of facilities is shortened.

To solve those problems, the present inventors have provided a molten glass conveying equipment element and a glass manufacturing apparatus, described in Patent Document 2.

In the molten glass conveying equipment element described in Patent Document 2, a ceramic structure having a coefficient of linear thermal expansion substantially equal to that of platinum or a platinum alloy constituting a conduit for molten glass made of platinum or a platinum alloy is arranged around the conduit, and thus, the difference in the amount of thermal expansion when heating or the difference in the amount of shrinkage when cooling become considerably small. As a result, cracks at the junction between a vertical pipe and a horizontal pipe due to thermal expansion when heating or shrinkage when cooling is prevented from occurring.

CITATION LIST

Patent Documents

Patent Document 1: JP-A-2002-87826
Patent Document 2: WO 2010/067669

SUMMARY OF INVENTION

Technical Problem

In the molten glass conveying equipment element described in Patent Document 2, a gap is provided between a conduit made of platinum or a platinum alloy and a ceramic structure, and deviation of the timing of thermal expansion when heating or shrinkage when cooling between the conduit and the ceramic structure can be thereby absorbed, and cracks at the junction can be prevented from occurring. However, in a case where such a gap is present, there is a possibility that the conduit deforms, leading to the breakage thereof.

It is considered in the molten glass conveying equipment element described in Patent Document 2 that a conduit made of the platinum or platinum alloy has sufficient strength during use. However, there is a possibility that strength of the conduit is decreased by, for example, deterioration of a material of the conduit due to the use in high temperature environment. Furthermore, there is a case that expansion pressure applied from molten glass is increased by the change of use condition of a molten glass conveying equipment element, for example, by the stirring of molten glass passing through the conduit with a stirrer. As a result, strength of the conduit becomes insufficient to expansion pressure applied from molten glass, and there is a possibility that the conduit deforms, leading to the breakage thereof.

To prevent deformation of the conduit, a ceramic structure may be arranged without providing a gap around the conduit. However, depending on the arrangement of the conduit and the shape of the conduit, there is difficulty in arranging the ceramic structure without providing a gap around the conduit. For example, it is difficult to arrange the ceramic structure without providing a gap around the conduit at the junction between a vertical pipe and a horizontal pipe. Moreover, JP-T-2004-070251 (the term "JP-T" as used herein means a published Japanese translation of a PCT application) discloses a hollow pipe made of platinum or a platinum alloy which has at least one convex portion, continuing 360° in a circumferential direction provided thereon for the purpose of absorbing expansion and shrinkage due to heat. Furthermore, in order to prevent breakage of the conduit by thermal stress or stress applied from outside during the use over a long period of time, JP-A-2006-315894 discloses hollow pipe made of platinum or a platinum alloy having convex portions and concave portions which continue 360° in a circumferential direction and are alternately provided along an axis direction. However, it is difficult to arrange the ceramic structure without providing a gap around the conduit having convex portions and concave portions provided thereon.

In addition, in the ceramic structure arranged in the conduit made of platinum or a platinum alloy, a material having excellent corrosion resistance to molten glass is selected. However, in a case where the temperature of the molten glass passing through the conduit is especially high, for example, in a case where the temperature of the molten glass passing through the conduit is 1,450° C. or higher, there is a possibility that the ceramic structure is subjected to significant erosion if the molten glass flowing out due to breakage of the conduit comes into contact with the ceramic structure.

To solve the above problems in the prior art, the present invention has an object to provide a molten glass conveying equipment element that achieves prevention of occurrence of cracks of a conduit due to thermal expansion when heating or shrinkage when cooling, and prevention of deformation of a conduit due to expansion pressure applied from molten glass, and has a ceramic structure that is difficult to be corroded even though molten glass is leaked for any reason, a method for producing the molten glass conveying equipment element, and a glass manufacturing apparatus containing the molten glass conveying equipment element. Further, the present invention has an object to stably produce a glass article with good quality by the glass manufacturing apparatus.

Technical Solution

In order to achieve the above object, the present invention provides a method for producing a molten glass conveying equipment element having a conduit structure for molten glass containing at least one conduit comprising platinum or a platinum alloy, a first ceramic structure provided around the conduit and a second ceramic structure located around the first ceramic structure, the method comprising:

filling a gap between the conduit and the second ceramic structure with a slurry body, the slurry body being prepared by blending: first particles having a median diameter D50 of 0.2 to 10 μm and containing, in terms of mass % to an entire composition, 90 wt % or more of zirconium oxide; second particles having a median diameter D50 of 0.2 to 2 mm and containing, in terms of mass % to the entire composition, 75 wt % or more of zirconium oxide, in which a proportion of cubic zirconia in the zirconium oxide is 80 wt % or more, and containing at least one of stabilizers selected from the group consisting of yttrium oxide and cerium oxide in a total content of 6 to 25 wt %; and third particles having a median diameter D50 of 1 to 500 μm and containing, in terms of mass % to the entire composition, 50 wt % or more of silicon dioxide, so as to satisfy that a mass ratio of a mass of the first particles to a mass of the second particles (mass of the first particles/mass of the second particles) is 0.25 to 0.6, and a mass ratio of a mass of the third particles in terms of silicon dioxide to a total mass of the first particles and the second particles (mass of the third particles in terms of silicon dioxide/(mass of the first particles+mass of the second particles)) is 0.05 to 0.2; and sintering the shiny body at a temperature of 1,300 to 1,550° C., thereby forming the first ceramic structure.

In addition, the present invention provides a molten glass conveying equipment element produced by the method for producing a molten glass conveying equipment element according to the present invention, wherein an average open porosity of the first ceramic structure is 20 to 60%, a coefficient of linear thermal expansion at 20 to 1,000° C. of the first ceramic structure is $8 \times 10^{-6}$ to $12 \times 10^{-6}$/° C. and the gap between the conduit and the first ceramic structure is less than 0.5 mm.

In addition, the present invention provides a glass manufacturing apparatus, including the molten glass conveying equipment element according to the present invention.

In addition, the present invention provides a method for producing a glass article using the above glass manufacturing apparatus, the method comprising:

heating a glass material, thereby obtaining molten glass; and forming and annealing the molten glass, thereby obtaining the glass article.

Advantageous Effects of Invention

According to the method for producing a molten glass conveying equipment element of the present invention, a first ceramic structure having a coefficient of linear thermal expansion nearly equal to that of platinum or a platinum alloy constituting a conduit for molten glass and having a given average open porosity can be formed around the conduit for molten glass made of the platinum or platinum alloy without providing a gap, without being affected by the arrangement and shape of the conduit.

In the molten glass conveying equipment element of the present invention, because the coefficient of linear thermal expansion of a conduit for molten glass made of the platinum or platinum alloy is nearly equal to that of the ceramic structure arranged around the conduit, the difference of the amount of thermal expansion when heating or the difference of the amount of shrinkage when cooling is extremely small. As a result, the occurrence of cracks in the conduit due to thermal expansion when heating or shrinkage when cooling, for example, the occurrence of cracks at a junction between a conduit having a center axis in a vertical direction and a conduit having a center axis in a horizontal direction, can be prevented. Additionally, the ceramic structure in the present invention is difficult to be eroded even though molten glass having an especially high temperature, in particular, the molten glass having a temperature of 1,450° C. or higher is leaked for any reason.

Furthermore, in the molten glass conveying equipment element of the present invention, because the first ceramic structure having sufficient compression strength in a temperature range that molten glass passes through the conduit is formed without providing a gap around the conduit for molten glass, deformation of the conduit due to expansion pressure applied from the molten glass passing thought the inside thereof is prevented.

In the glass manufacturing apparatus of the present invention containing the molten glass conveying equipment element, the occurrence of cracks in the conduit due to thermal expansion when heating or shrinkage when cooling is prevented, the deformation of the conduit due to expansion pressure applied from molten glass passing through the inside thereof is prevented, and the ceramic structure is difficult to be corroded even though molten glass is leaked for any reason. Therefore, the glass manufacturing apparatus has excellent reliability and can produce glass stably over a long period of time.

Further, in the method for producing a glass article of the present invention, it is possible to stably produce the glass article with good quality by the glass manufacturing apparatus.

DESCRIPTION OF EMBODIMENTS

The present invention is described below by reference to the drawings.

Figure 1:
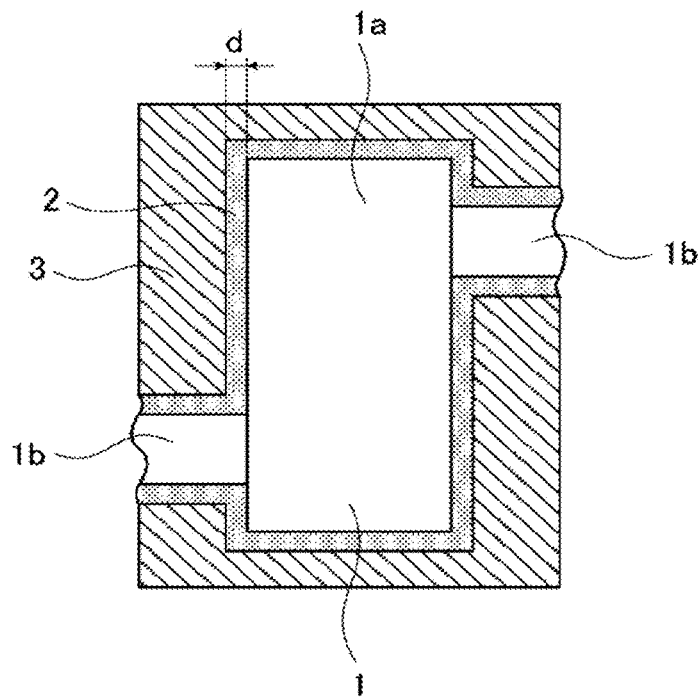
FIG. 1 is a cross-sectional view showing one configuration example of the molten glass conveying equipment element of the present invention.

FIG. 1 is a cross-sectional view showing one configuration example of the molten glass conveying equipment element of the present invention.

In the molten glass conveying equipment element shown in FIG. 1, a conduit structure 1 for molten glass has a structure that two conduits 1b and 1b having a center axis in a horizontal direction (hereinafter referred to as "horizontal pipe") are communicated with a conduit 1a having a center axis in a vertical direction (hereinafter referred to as a "vertical pipe").

In FIG. 1, a first ceramic structure 2 is arranged around the conduits (vertical pipe 1a and horizontal pipe 1b) constituting the conduit structure 1 for molten glass and a second ceramic structure 3 is located around the first ceramic structure 2.

The molten glass conveying equipment element in the present invention is not limited to the embodiment shown in the drawings so long as the element has at least one conduit.

Figure 2:
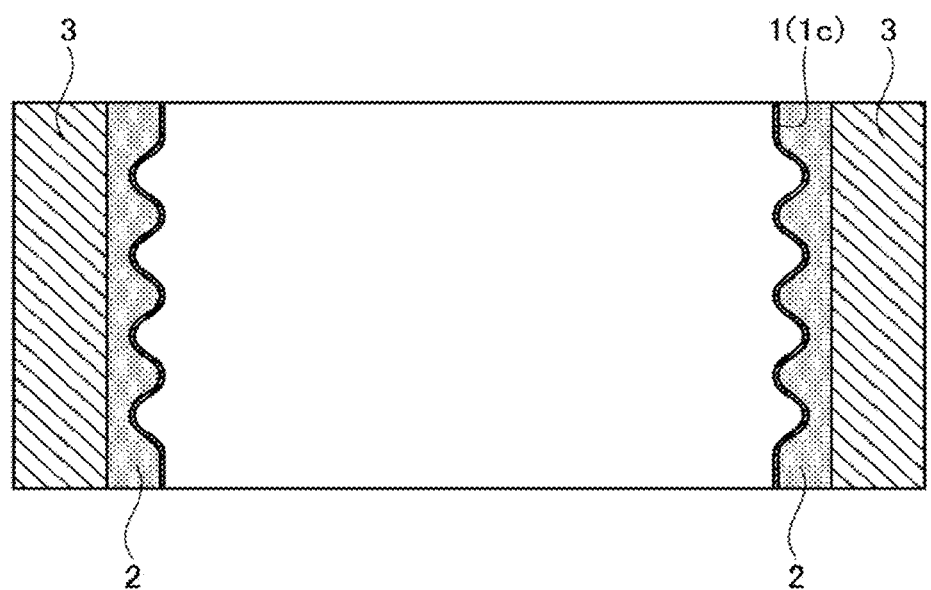
FIG. 2 is a cross-sectional view showing another configuration example of the molten glass conveying equipment element of the present invention.

FIG. 2 is a cross-sectional view showing another configuration example of the molten glass conveying equipment element of the present invention.

In the molten glass conveying equipment element shown in FIG. 2, the conduit structure 1 for molten glass has only one conduit 1c. In the conduit 1c, convex portions and concave portions which continue 360° in a circumferential direction are alternately provided along an axis direction, and have a bellows-like outer shape.

In FIG. 2, the first ceramic structure 2 is arranged around the conduit 1c constituting the conduit structure 1 for molten glass, and the second ceramic structure 3 is located around the first ceramic structure 2.

In the case of the structure in which the vertical pipe and the horizontal pipe are communicated with each other as shown in FIG. 1, when the difference in a coefficient of thermal expansion between the conduits (the vertical pipe 1a and the horizontal pipe 1b) constituting the conduit structure 1 for molten glass and the ceramic structure arranged around the conduits is large, the difference in the amount of thermal expansion when heating or the difference in the amount of shrinkage when cooling cannot be absorbed by the elongation of a pipe material. Accordingly, there is a possibility that cracks occur at the junction between the vertical pipe 1a and the horizontal pipe 1b. For this reason, it is preferred to apply the present invention that the difference in a coefficient of thermal expansion between the conduits constituting the conduit structure 1 for molten glass and the first ceramic structure 2 arranged around the conduits is small and the occurrence of cracks in the conduits constituting the conduit structure 1 for molten glass due to thermal expansion when heating or shrinkage when cooling can be suppressed.

Furthermore, in the periphery of the junction between the vertical pipe 1a and the horizontal pipe 1b, a gap is easily generated between the conduits (vertical pipe 1a and horizontal pipe 1b) and the ceramic structure such as refractory brick arranged around the conduits, and there is a possibility that the conduits deform by expansion pressure applied from molten glass and may break. Therefore, it is preferred to apply the present invention that a gap between the conduits (vertical pipe 1a and horizontal pipe 1b) constituting the conduit structure 1 for molten glass and the first ceramic structure 2 arranged around the conduits is extremely small and the deformation of the conduits due to expansion pressure applied from molten glass can be suppressed.

Even in the structure in which the vertical pipe is communicated with the horizontal pipe as shown in FIG. 1, the structure is not limited to the embodiment shown in the drawing, and the structure may be that one horizontal pipe is communicated with one vertical pipe. Furthermore, the structure may further be that one end side of one horizontal pipe is communicated with one vertical pipe and the other end side of the horizontal pipe is communicated with another one vertical pipe. The structure may further be that at least one vertical pipe or horizontal pipe, or both are communicated with such a structure.

The vertical pipe in the present invention is not always required to satisfy that its center axis has a vertical direction in a strict sense. The center axis may be inclined to a vertical direction. The same applies to the horizontal pipe, and its center axis is not always required to have a horizontal direction in a strict sense. The center axis may be inclined to some extent to the horizontal direction. In short, the vertical pipe and horizontal pipe in the present invention have an intention of the relative relationship of those pipes, and when one conduit is a vertical pipe, the conduit having the relationship intersecting with the vertical pipe is a horizontal pipe.

In the case that the conduit constituting the conduit structure for molten glass has a shape having irregularities as the conduit 1c shown in FIG. 2, a gap is easily generated between the conduit and the ceramic structure such refractory brick arranged around the conduit. Due to this, the conduit is likely to deform by expansion pressure applied from molten glass, leading to breakage thereof. For this reason, it is preferred to apply the present invention that a gap between the conduit 1c constituting the conduit structure 1 for molten glass and the first ceramic structure 2 provided around the conduit 1c is extremely small and the deformation of the conduit by expansion pressure applied from molten glass can be suppressed.

Even in the case of having only one conduit as shown in FIG. 2, the conduit is not limited to the embodiment in which convex portions and concave portions which continue 360° in a circumferential direction are alternately provided along an axis direction, as shown in FIG. 2. The conduit may have either one of convex portions and concave portions, and may be an ordinary straight pipe that does not have convex portion and concave portion.

A stirrer for stirring molten glass may be provided in the inside of the conduit constituting the conduit structure for molten glass.

In the case that a stirrer for stirring molten glass is provided in the inside of the conduit constituting the conduit structure for molten glass, the conduit is likely to deform by expansion pressure applied from molten glass, leading to breakage thereof. For this reason, it is preferred to apply the present invention that a gap between the conduit constituting the conduit structure for molten glass and the first ceramic structure provided around the conduit is extremely small and the deformation of the conduit by expansion pressure applied from molten glass can be suppressed.

In the present invention, the conduits (vertical pipe 1a and horizontal pipe 1b in FIG. 1, and conduit 1c in FIG. 2) constituting the conduit structure 1 for molten glass are used as a conduit for molten glass. Therefore, the constituent material is required to have excellent heat resistance and corrosion resistance to molten glass. For this reason, the conduits (vertical pipe 1a and horizontal pipe 1b in FIG. 1, and conduit 1c in FIG. 2) constituting the conduit structure 1 for molten glass include platinum or a platinum alloy such as platinum-gold alloy, platinum-rhodium alloy or platinum-iridium alloy.

As the platinum or platinum alloy constituting the conduits (vertical pipe 1a and horizontal pipe 1b in FIG. 1, and conduit 1c in FIG. 2) constituting the conduit structure 1 for molten glass, one including a reinforced platinum including platinum or a platinum alloy, and metal oxide particles such as $Al_2O_3$, $ZrO_2$ or $Y_2O_3$ dispersed therein is preferred. The reinforced platinum produces the effect that the metal oxide particles dispersed in platinum or a platinum alloy prevents dislocation and growth of crystal grains, thereby enhancing the mechanical strength. However, in the meanwhile, ductility of a material is decreased as compared with the case of platinum or a platinum alloy. Therefore, the difference in the amount of thermal expansion when heating or the difference in the amount of shrinkage when cooling, between the conduit constituting the conduit structure 1 for molten glass and the ceramic structure such as an insulting brick arranged around the conduit cannot be absorbed by elongation of a pipe material, and cracks are likely to occur in the conduit. For this reason, it is preferred to apply the present invention that the occurrence of cracks in the conduits constituting the conduit structure 1 for molten glass due to thermal expansion when heating or shrinkage when cooling can be suppressed.

In the present invention, the first ceramic structure 2 contains 65 wt % or more of zirconium oxide in terms of mass percentage to the entire composition, in which the proportion of cubic zirconia in the zirconium oxide is 60 wt % or more. In other words, the first ceramic structure 2 mainly includes cubic zirconia that is fully stabilized zirconia.

When the first ceramic structure 2 mainly includes cubic zirconia, the amount of thermal expansion when heating or the amount of shrinkage when cooling, of the conduits constituting the conduit structure 1 for molten glass nearly equals to that of the first ceramic structure 2 provided around the conduits. As a result, the difference in the amount of thermal expansion when heating or the amount of shrinkage when cooling becomes extremely small, and this prevents the occurrence of cracks in the conduits constituting the conduit structure 1 for molten glass due to thermal expansion when heating or shrinkage when cooling, for example, the occurrence of cracks at the junction between the vertical pipe 1a and the horizontal pipe 1b in FIG. 1.

The cubic zirconia that is fully stabilized zirconia has a coefficient of linear thermal expansion extremely close to that of the platinum or platinum alloy constituting the conduits at 20 to 1,000° C. as shown below.

Platinum or platinum alloy: $9.5 \times 10^{-6}$/° C. to $11 \times 10^{-6}$/° C.
Cubic zirconia: $8.5 \times 10^{-6}$/° C. to $10.5 \times 10^{-6}$1/° C.

The zirconium oxide such as cubic zirconia has excellent heat resistance, corrosion resistance to molten glass, and corrosion resistance to a corrosive gas, and is therefore suitable as the first ceramic structure 2 to be arranged around the conduits (vertical pipe 1a and horizontal pipe 1b in FIG. 1, and conduit 1c in FIG. 2) constituting the conduit structure 1 for molten glass.

To achieve the above effect, the coefficient of linear thermal expansion at 20 to 1,000° C. of the ceramic structure is $8 \times 10^{-6}$ to $12 \times 10^{-6}$/° C., preferably $9 \times 10^{-6}$ to $11 \times 10^{-6}$/° C., and more preferably $9.5 \times 10^{-6}$ to $10.5 \times 10^{-6}$/° C.

However, the coefficient of linear thermal expansion of platinum or a platinum alloy somewhat differs depending on composition. Therefore, it is preferred to select the coefficient of linear thermal expansion of the first ceramic structure 2 depending on the coefficient of linear thermal expansion of the platinum or platinum alloy to be used in the conduits (vertical pipe 1a and horizontal pipe 1b in FIG. 1, and conduit 1c in FIG. 2) constituting the conduit structure 1 for molten glass. Specifically, the coefficient of linear thermal expansion at 20 to 1,000° C. of the first ceramic structure 2 is preferably within ±15%, more preferably within ±10%, and still more preferably within ±5%, of the coefficient of linear thermal expansion at 20 to 1,000° C. of the platinum or platinum alloy to be used in the conduits (vertical pipe 1a and horizontal pipe 1b in FIG. 1, and conduit 1c in FIG. 2) constituting the conduit structure 1 for molten glass.

To achieve the above coefficient of linear thermal expansion, the amount of zirconium oxide contained in the first ceramic structure 2 is required to be 65 wt % or more, and the proportion of cubic zirconia in the zirconium oxide is required to be 60 wt % or more. The proportion of the cubic zirconia in the zirconium oxide contained in the first ceramic structure 2 is preferably 63 wt % or more, and more preferably 67 wt % or more.

In the present invention, the first ceramic structure 2 has an average open porosity of 20 to 60%. The first ceramic structure 2 having the above composition has excellent corrosion resistance to molten glass, but in the case where the average open porosity exceeds 60%, corrosion resistance to molten glass is deteriorated. On the other hand, in the case where the average open porosity is less than 20%, thermal shock resistance of the first ceramic structure 2 is deteriorated. Furthermore, heat capacity is increased. As a result, deviation is easily occurred in the timing of thermal expansion when heating or shrinkage when cooling between the conduits (vertical pipe 1a and horizontal pipe 1b in FIG. 1, and conduit 1c in FIG. 2) constituting the conduit structure 1 for molten glass and the first ceramic structure 2, and there is a possibility that cracks occur in the conduits constituting the conduit structure 1 for molten glass. Additionally, longer time is required for heating or cooling.

In the first ceramic structure 2, the average open porosity is preferably 25 to 50%, and more preferably 30 to 40%.

The average open porosity of the first ceramic structure 2 can be obtained by the measurement with Archimedes method or mercury porosimeter.

In the first ceramic structure 2, the open porosity may differ depending on a region. For example, when the open porosity of the region facing the conduits (vertical pipe 1a and horizontal pipe 1b in FIG. 1, and conduit 1c in FIG. 2) constituting the conduit structure 1 for molten glass is lower than that of other region, corrosion resistance to molten glass can be enhanced.

In addition, according to the following two features, the first ceramic structure 2 is excellent in corrosion resistance to the molten glass having an especially high temperature, in particular, the molten glass having a temperature of 1,450° C. or higher.

As the first feature, a mass ratio of a total mass of yttrium oxide and cerium oxide to a mass of zirconium oxide contained in the first ceramic structure 2 (total mass of yttrium oxide and cerium oxide/mass of zirconium oxide) is 0.05 to 0.25.

The present inventors have conducted intensive studies of the corrosion resistance of the ceramic structure to the molten glass having a temperature of 1,450° C. or higher. As a result, the present inventors have found that when the ceramic structure is immersed in the molten glass having a temperature of 1,450° C. or higher, the yttrium oxide and the cerium oxide which are added, as a stabilizer, to convert zirconium oxide into cubic zirconia that is stabilized zirconia are released from the ceramic structure, and particles constituting the ceramic structure are refined, leading to the corrosion of the ceramic structure.

Accordingly, in the first ceramic structure 2 of the present invention, the yttrium oxide and the cerium oxide are contained, as a stabilizer, in amounts required to achieve the proportion of cubic zirconia in the zirconium oxide being 60 wt % or more. On the other hand, in order to prevent the yttrium oxide and the cerium oxide from being released from the ceramic structure as much as possible, the total mass of the yttrium oxide and the cerium oxide contained in the ceramic structure, in terms of mass ratio to the zirconium oxide, is set to be 0.05 to 0.25. In a case where the mass ratio is smaller than 0.05, there is a possibility that the proportion of the cubic zirconia in the zirconium oxide may not be 60 wt % or more.

On the other hand, in a case where the mass ratio is higher than 0.25, when the ceramic structure is immersed in the molten glass of 1,450° C. or higher, there is a possibility that the yttrium oxide and the cerium oxide added as a stabilizer are released from the ceramic structure, and the particles constituting the ceramic structure are refined.

The mass ratio is more preferably 0.05 to 0.08, and still more preferably 0.055 to 0.07.

As the second feature, a part of the zirconium oxide contained in the first ceramic structure 2 is converted into zircon ($ZrSiO_4$).

As described above, in a case where the ceramic structure is immersed in the molten glass of 1,450° C. or higher, the yttrium oxide and the cerium oxide added as a stabilizer are released from the ceramic structure and the particles constituting the ceramic structure are refined. The present inventors have found that when the zirconium oxide in the ceramic structure is converted into zircon ($ZrSiO_4$) by reacting with silicon dioxide ($SiO_2$) in the molten glass, the progress of the refining can be suppressed, and the corrosion of the ceramic structure can be further suppressed.

Accordingly, in the first ceramic structure 2 of the present invention, a part of the zirconium oxide contained in the first ceramic structure 2 is converted into zircon ($ZrSiO_4$) in advance.

Specifically, in the first ceramic structure 2 of the present invention, the zircon ($ZrSiO_4$) is contained in a content of 1 to 20 wt %.

In a case where the content of the zircon ($ZrSiO_4$) in the first ceramic structure 2 is lower than 1%, during immersion in the molten glass of the 1,450° C. or higher, the progress of the refining of the particles constituting the ceramic structure cannot be sufficiently suppressed, and the corrosion of the ceramic structure cannot be further suppressed.

On the other hand, in a case where the content of the zircon ($ZrSiO_4$) in the first ceramic structure 2 is higher than 20%, since a coefficient of linear thermal expansion at 20 to 1,000° C. of the first ceramic structure 2 becomes small, there is a possibility that thermal expansion when heating the conduit constituting the conduit structure 1 for molten glass is inhibited, leading to breakage of the conduit.

The content of the zircon ($ZrSiO_4$) in the first ceramic structure 2 is more preferably 3 to 15 wt %, and still more preferably 5 to 10 wt %.

In FIGS. 1 and 2, a gap is not present between the conduits (vertical pipe 1a and horizontal pipe 1b in FIG. 1, and conduit 1c in FIG. 2) constituting the conduit structure 1 for molten glass and the first ceramic structure 2.

As described above, in a case where a gap is present between the conduits (vertical pipe 1a and horizontal pipe 1b in FIG. 1, and conduit 1c in FIG. 2) constituting the conduit structure 1 for molten glass and the first ceramic structure 2, there is a possibility that the conduits are likely to deform by expansion pressure applied from molten glass, leading to breakage thereof.

In the case where a gap is not present between the conduits (vertical pipe 1a and horizontal pipe 1b in FIG. 1, and conduit 1c in FIG. 2) constituting the conduit structure 1 for molten glass and the first ceramic structure 2, the deformation of the conduit by expansion pressure applied from molten glass can be suppressed.

However, it is sufficient in the present invention if a gap between the conduits (vertical pipe 1a and horizontal pipe 1b in FIG. 1, and conduit 1c in FIG. 2) constituting the conduit structure 1 for molten glass and the first ceramic structure 2 is extremely small, specifically, the gap is less than 0.5 mm.

The gap between the conduits (vertical pipe 1a and horizontal pipe 1b in FIG. 1, and conduit 1c in FIG. 2) constituting the conduit structure 1 for molten glass and the first ceramic structure 2 is preferably 0.4 mm or less, and more preferably 0.2 mm or less. Still more preferably, the gap is not present.

To suppress the deformation of the conduits constituting the conduit structure 1 for molten glass due to expansion pressure applied from molten glass, the first ceramic structure 2 is required to have sufficient compression strength in a temperature region when molten glass passes through the conduits. Specifically, the first ceramic structure 2 has compression strength at 1,400° C. of preferably 5 MPa or more, more preferably 8 MPa or more, and still more preferably 10 MPa or more. As the reason of using the compression strength at 1,400° C., the temperature is a temperature at which the first ceramic structure 2 generally undergoes when molten glass passes through the conduits.

In the present invention, a thickness d of the first ceramic structure 2 is preferably 15 mm or more and 50 mm or less. In the case where the thickness d of the first ceramic structure 2 is less than 15 mm, the amount of thermal expansion when heating or the amount of shrinkage when cooling, of the first ceramic structure 2 is hindered by the second ceramic structure 3. As a result, the difference in the amount of thermal expansion when heating or the amount of shrinkage when cooling becomes large between the conduits (vertical pipe 1a and horizontal pipe 1b in FIG. 1, and conduit 1c in FIG. 2) constituting the conduit structure 1 for molten glass and the first ceramic structure 2, and there is a possibility that cracks occur in the conduits constituting the conduit structure 1 for molten glass.

Moreover, in the case where the thickness d of the first ceramic structure 2 is less than 15 mm, when a gap between the conduits constituting the conduit structure 1 for molten glass and the second ceramic structure 3 is filled with a slurry body and the first ceramic structure 2 is formed by sintering the slurry body in the procedures described hereinafter, there is a possibility that workability is deteriorated.

Since cubic zirconia is an expensive material, it is preferred from the standpoint of costs that the first ceramic structure 2 keeps the thickness at a minimum. From this standpoint, the thickness d of the first ceramic structure 2 is preferably 50 mm or less.

On the other hand, in the case where the thickness d of the first ceramic structure 2 is larger than 50 mm, there is a possibility that temperature difference occurs in a thickness direction of the first ceramic structure 2 when molten glass passes through the conduits.

The thickness d of the first ceramic structure 2 is more preferably from 20 to 40 mm, and still more preferably from 25 to 35 mm.

In the case where the conduit constituting the conduit structure 1 for molten glass has irregularities as in the conduit 1c in FIG. 2, the thickness is required to satisfy the above range in all regions of the first ceramic structure 2 facing the irregularities of the conduit 1c.

As described above, because cubic zirconia is an expensive material, the first ceramic structure 2 is that, since the gap between the conduits constituting the conduit structure 1 for molten glass and the second ceramic structure 3 is filled with a slurry body, and the first ceramic structure 2 is formed by sintering the slurry body, the second ceramic structure 3 is positioned around the first ceramic structure 2.

As the second ceramic structure 3, an insulating brick mainly including at least one selected from the group consisting of alumina, magnesia, zircon and silica can be used.

Specific examples of the insulating brick to be used as the second ceramic structure 3 include silica-alumina insulating brick, zirconia insulating brick, magnesia insulting brick and the like. Examples of commercially available products of the insulating brick include SP-15 (manufactured by Hinomaru Yogyo Co., Ltd.) and LBK3000 (manufactured by Isolite Insulating Products Co., Ltd.).

A method for producing the molten glass conveying equipment element of the present invention is described below.

In the present invention, a gap between the conduits (vertical pipe 1a and horizontal pipe 1b in FIG. 1, and conduit 1c in FIG. 2) constituting the conduit structure 1 for molten glass and the first ceramic structure 2 is required to be less than 0.5 mm. However, in the case where the insulating brick mainly including cubic zirconia that is fully stabilized zirconia is arranged around the conduits constituting the conduit structure 1 for molten glass, the above gap cannot be achieved.

For this reason, in the present invention, the gap between the conduits (vertical pipe 1a and horizontal pipe 1b in FIG. 1, and conduit 1c in FIG. 2) constituting the conduit structure 1 for molten glass and the second ceramic structure 3 is filled with a slurry body containing first particles, second particle, and third particles to be described below so as to satisfy the composition of the first ceramic structure 2 ((1) a content of zirconium oxide is 65 wt % or more, the proportion of cubic zirconia in the zirconium oxide is 60 wt % or more; (2) a mass ratio of a total mass of the yttrium oxide and the cerium oxide to a mass of the zirconium oxide contained in the ceramic structure is 0.05 to 0.25; and (3) a content of zircon ($ZrSiO_4$) in the first ceramic structure 2 is 1 to 20 wt %), and the first ceramic structure 2 is formed by sintering the slurry body.

The zirconia particles (the first particles and the second particles) contained in the slurry body to be used must be selected such that the gap between the first ceramic structure 2 after formation and the conduits (vertical pipe 1a and horizontal pipe 1b in FIG. 1, and conduit 1c in FIG. 2) constituting the conduit structure 1 for molten glass is less than 0.5 mm, and the first ceramic structure 2 after formation has sufficient compression strength in a temperature range when molten glass passes through the conduits.

To reduce the gap between the first ceramic structure 2 after formation and the conduits (vertical pipe 1a and horizontal pipe 1b in FIG. 1, and conduit 1c in FIG. 2) constituting the conduit structure 1 for molten glass, it is only necessary to reduce the dimensional change (shrinkage) during sintering of the slurry body. To achieve this, the slurry body containing zirconia particles (the first particles and the second particles) having large particle size should be used.

However, in the case where the slurry body containing only particles having large particle size (the first particles, the second particles, and the third particles) is used, junction area among particles is small, and as a result, compression strength of a sintered body, i.e., the first ceramic structure 2, is decreased.

On the other hand, in the case where the slurry body containing zirconia particles (the first particles and the second particles) having small particle size is used, those particles bind so as to reinforce junction points of large particles. Therefore, compression strength of the sintered body, that is, the first ceramic structure 2, is enhanced.

However, in the case where the slurry body containing only zirconia particles (the first particles and the second particles) having small particle size is used, dimensional change (shrinkage) of the slurry body when sintering is increased, and as a result, the gap between the first ceramic structure 2 after formation and the conduits (vertical pipe 1a and horizontal pipe 1b in FIG. 1, and conduit 1c in FIG. 2) constituting the conduit structure 1 for molten glass becomes large.

In the present invention, as described hereinafter, by selecting particles in a specific particle size range, as the first particles, the second particles, and the third particles, and by using the slurry body containing these particles in specific proportions, the gap between the first ceramic structure 2 after formation and the conduits (vertical pipe 1a and horizontal pipe 1b in FIG. 1, and conduit 1c in FIG. 2) constituting the conduit structure 1 for molten glass can be set to less than 0.5 mm, and the first ceramic structure 2 after formation has sufficient compression strength in a temperature range when molten glass passes through the conduits.

More specifically, in the present invention, the following slurry body is used: first particles having a median diameter D50 of 0.2 to 10 μm and containing, in terms of mass % to the entire composition, 90 wt % or more of zirconium oxide, second particles having a median diameter D50 of 0.2 to 2 mm and containing, in terms of mass % to the entire composition, 75 wt % or more of zirconium oxide, in which a proportion of cubic zirconia in the zirconium oxide is 80 wt % or more, and containing at least one of stabilizers selected from the group consisting of yttrium oxide and cerium oxide in a total content of 6 to 25 wt %, and third particles having a median diameter D50 of 1 to 500 μm and containing, in terms of mass % to the entire composition, 50 wt % or more of silicon dioxide are blended in such a way that a mass ratio of the mass of the first particles to the mass of the second particles (mass of the first particles/mass of the second particles) is 0.25 to 0.6, and a mass ratio of the mass of the third particles in terms of silicon dioxide to the total mass of the first particles and the second particles (mass of the third particles in terms of silicon dioxide/(mass of the first particles+mass of the second particles)) is 0.05 to 0.2.

The first particles not containing a stabilizer are ordinary zirconia particles, and the second particles containing the stabilizer are stabilized zirconia particles.

In the slurry body, when the second particles (stabilized zirconia particles) having large median diameter D50 constitute a framework of a sintered body, the first particles (zirconia particles) having small median diameter D50 reinforce junction point of the large particles constituting a framework of the sintered body while suppressing dimensional change (shrinkage) when sintering. As a result, compression strength of the sintered body, that is, the first ceramic structure 2, is enhanced.

The reason why one is set as the ordinary zirconia particles and the other is set as the stabilized zirconia particles among the first particles and the second particles is that a total mass of the yttrium oxide and the cerium oxide contained in the first ceramic structure 2 is set to be 0.05 to 0.25, in terms of mass ratio to zirconium oxide, by using zirconia particles not containing a stabilizer, and the zirconia particles not containing a stabilizer are reacted with the third particles which contain, in terms of mass % to the entire composition, 50 wt % or more of silicon dioxide to convert into zircon ($ZrSiO_4$) when sintering the slurry body.

The reason for converting the first particles having a small median diameter D50 into the zirconia particles not containing a stabilizer is that since the second particles having a larger median diameter D50 constitute a framework of a sintered body, it is converted into zircon ($ZrSiO_4$) by reacting the first particles and the third particles.

It is important in the first particles (zirconia particles) and the second particles (stabilized zirconia particles) that not only a particle size merely differs to each other, but the median diameter D50 falls within the range described above.

In the case where the median diameter D50 of the first particles (zirconia particles) is less than 0.2 μm, particle aggregation is easily occurred, and the particles cannot be uniformly dispersed. As a result, regions in which junction points of framework particles of the sintered body are not reinforced remain, and as a result, compression strength of the sintered body, that is, the first ceramic structure 2, is deteriorated.

In the present invention, two kinds of zirconia particles (the first particles (zirconia particles) and the second particles (stabilized zirconia particles)) having different median diameter D50 are blended to form a slurry body. Therefore, it is preferred that the first particles (zirconia particles) having small median diameter D50 are mixed in a ball mill together with ion-exchanged water, a pH regulator, and an organic binder to be added as necessary, thereby forming a slurry precursor, and the slurry precursor is then mixed with the second particles (stabilized zirconia particles) having large median diameter D50 by a planetary mixer, thereby forming a slurry body. A step for mixing the third particles is selected depending on the median diameter D50. In a case where the median diameter D50 of the third particles is 1 to 10 μm, it is preferable to form a slurry precursor by mixing with the first particles. In a case where the median diameter D50 of the third particles is 10 to 500 μm, it is preferable to mix with the second particles.

In the case where the median diameter D50 of the first particles (zirconia particles) exceeds 10 μm, the first particles settle down when preparing the slurry precursor in the procedures described above. As a result, good slurry precursor (slurry precursor having zirconia particles uniformly dispersed therein) cannot be obtained.

Furthermore, even in the case where the slurry precursor has been obtained, the junction points of framework particles of the sintered body cannot be sufficiently reinforced when sintering the slurry body prepared using the slurry precursor, and many gaps are present in the sintered body. As a result, compression strength of the sintered body, that is, the first ceramic structure 2, is deteriorated.

In the first particles (zirconia particles), the median diameter D50 is preferably 1 to 5 μm, and more preferably 2 to 4 μm.

In the first particles (zirconia particles), cumulative undersize 90% diameter (D90) of 15 μm or less is preferred for maintaining uniformity of slurry and enhancing the compression strength of the sintered body, and it is more preferably 10 μm or less.

In the case where the median diameter D50 of the second particles (stabilized zirconia particles) is less than 0.2 mm, dimensional change (shrinkage) when sintering is increased.

On the other hand, in the case where the median diameter D50 of the second particles (stabilized zirconia particles) exceeds 2 mm, the first particles (zirconia particles) and the second particles (stabilized zirconia particles) are not uniformly dispersed when mixing the slurry precursor containing the first particles (zirconia particles) with the second particles (stabilized zirconia particles) by a planetary mixer, and the slurry body having a desired composition cannot be obtained.

Furthermore, even in the case where the slurry body has been obtained, junction area as framework particles of the sintered body is decreased when sintering the slurry body, and compression strength of the sintered body, that is, the first ceramic structure 2, is deteriorated.

In the second particles (stabilized zirconia particles), the median diameter D50 is preferably 0.25 to 1.75 mm, and more preferably 0.5 to 1.5 mm.

In the second particles (stabilized zirconia particles), cumulative undersize 10% diameter (D10) of 0.1 mm or more is preferred for suppressing dimensional change (shrinkage) when sintering and enhancing the compression strength of the sintered body, and it is more preferably 0.2 mm or more.

In the slurry body, in the case where the mass ratio of the mass of the first particles (zirconia particles) to the mass of the second particles (stabilized zirconia particles) (mass of the first particles/mass of the second particles) is smaller than 0.25, junction points of coarse particles that are framework particles of the sintered body cannot be sufficiently reinforced when sintering the slurry body, and compression strength of the sintered body, that is, the first ceramic structure 2, is deteriorated.

On the other hand, in the slurry body, in the case where the mass ratio of the mass of the first particles (zirconia particles) to the mass of the second particles (stabilized zirconia particles) (mass of the first particles/mass of the second particles) is larger than 0.6, dimensional change (shrinkage) when sintering is increased.

In the slurry body, the mass ratio of the mass of the first particles (zirconia particles) to the mass of the second particles (stabilized zirconia particles) (mass of the first particles/mass of the second particles) is preferably 0.30 to 0.55, more preferably 0.35 to 0.5, and still more preferably 0.4 to 0.5.

In the present invention, the first ceramic structure 2 is formed by filling the gap between the conduits (vertical pipe 1a and horizontal pipe 1b in FIG. 1, and conduit 1c in FIG. 2) constituting the conduit structure 1 for molten glass and the second ceramic structure 3 with the slurry body and sintering the slurry body. Therefore, it is preferable that the composition of the second particles (stabilized zirconia particles) contained in the slurry body is the same as that of the first ceramic structure described above, and the proportion of the cubic zirconia in the zirconia oxide is higher than that of the first ceramic structure. The reason thereof is that the zirconia particles not containing a stabilizer are used as the first particles.

For this reason, the second particles contain zirconium oxide in an amount of 75 wt % or more in terms of mass % to the entire composition, and the proportion of the cubic zirconia in the zirconium oxide is 80 wt % or more.

The second particles (stabilized zirconia particles) contain a stabilizer to be added to convert zirconium oxide into cubic zirconia that is stabilized zirconia, as the remainder excluding the zirconium oxide.

Examples of the stabilizer include yttrium oxide, cerium oxide, a magnesium oxide, a calcium oxide and an erbium oxide. The yttrium oxide and cerium oxide are preferred for the reasons that those have excellent corrosion resistance to molten glass, are easily available and are stable even though those are held at high temperature for a long period of time.

In the case where at least one of stabilizers selected from the group consisting of the yttrium oxide and the cerium oxide is contained, the total content of those is 6 wt % or more, preferably 8 wt % or more, and more preferably 10 wt % or more.

However, in the case where the amount of the stabilizer to be added is too large, there are problems that sintering becomes difficult and cost for raw materials is increased. For this reason, the total content of those is preferably 25 wt % or less, and more preferably 20 wt % or less.

As the remainder of the second particles (stabilized zirconia particles), unavoidable impurities and the like may be included. Moreover, the second particles (stabilized zirconia particles) may contain other components other than the zirconium oxide and the stabilizer in the total amount of about 8 wt % or less so long as those do not affect the present invention. Examples of the other components include $Al_2O_3$ and MgO that are added to improve sinterability. Those can be contained in the total amount of about 5 wt % or less.

The content of zirconium oxide in the second particles (stabilized zirconia particles) differs depending on the amount of the stabilizer to be added. However, in order to fall the coefficient of thermal expansion within a given range, the content of the zirconium oxide is 75 wt % or more, preferably 80 wt % or more, and more preferably 85% or more. On the other hand, the upper limit of the content of the zirconium oxide in the second particles (stabilized zirconia particles) is about 94 wt % from the balance with the amount of the stabilizer to be added.

The first particles (zirconia particles) can include unavoidable impurities and the like as the remainder excluding the zirconium oxide. Moreover, the first particles (zirconia particles) may contain other components other than the zirconium oxide in the total amount of about 8 wt % or less so long as those do not affect the present invention. Examples of the other components include $Al_2O_3$ and MgO that are added to improve sinterability. Those can be contained in the total amount of about 5 wt % or less.

As described above, when sintering the slurry body, the third particles are blended therein to convert into zircon ($ZrSiO_4$) by reacting with the first particles (zirconia particles).

As a result, the third particles contain, in terms of mass % to the entire composition, 50 wt % or more of silicon dioxide. As the third particles, glass particles which contain, in terms of mass % to the entire composition, 50 wt % or more of silicon dioxide can be used in addition to silica particles substantially consisting of only the silicon oxide. However, of the third particles, since the components other than the silicon dioxide remain in the sintered body after sintering the slurry body, it is preferable that the content of the silicon dioxide in the particles is high. In the case where the glass particles are used as the third particles, particles containing 60 wt % or more of the silicon dioxide are preferably used and particles containing 70 wt % or more of the silicon dioxide are more preferably used.

In the case where the glass particles are used as the third particles, the components other than the silicon dioxide are not limited, but it is preferable that particles having the same composition as that of the molten glass passing through the conduit (1a, 1b, and 1c) constituting the conduit structure 1 for molten glass are used.

As the third particles, silica particles or glass particles having a median diameter D50 of 1 to 500 μM are used. In the case where the median diameter D50 of particles is less than 1 μm, particle aggregation easily occurrs, and the particles cannot be uniformly dispersed. As a result, there is a problem that it is difficult to achieve the uniform composition of the sintered body, that is, the first ceramic structure 2.

On the other hand, in the case where the median diameter D50 of the particles is more than 500 μm, since particles having a larger particle size remain in the sintered body, sintering between the first particles (zirconia particles) is prevented. As a result, there is a problem that compression strength and corrosion resistance in the molten glass of the sintered body, that is, the first ceramic structure 2 are deteriorated.

In the case where the silica particles are used as the third particles, particles having a median diameter D50 of 5 to 50 μm are preferably used, and particles having a median diameter D50 of 10 to 30 μm are more preferably used.

In the case where the glass particles are used as the third particles, particles having a median diameter D50 of 10 to 300 μm are preferably used, and particles having a median diameter D50 of 20 to 100 μm are more preferably used.

In the case where a mass ratio of the mass of the third particles in terms of silicon dioxide to the total mass of the first particles and the second particles (mass of the third particles in terms of silicon dioxide/(mass of the first particles+mass of the second particles)) is smaller than 0.05, converting zirconium oxide into zircon ($ZrSiO_4$) becomes insufficient when sintering the slurry body, and during immersion in the molten glass of 1,450° C. or higher, the progress of the refining of the particles constituting the ceramic structure cannot be sufficiently suppressed, and the corrosion of the ceramic structure cannot be further suppressed.

In the case where a mass ratio of the mass of the third particles in terms of silicon dioxide to the total mass of the first particles and the second particles (mass of the third particles in terms of silicon dioxide/(mass of the first particles+mass of the second particles)) is larger than 0.2, sintering between the first particles (zirconia particles) is prevented. As a result, there is a problem that compression strength and corrosion resistance in the molten glass of the sintered body, that is, the first ceramic structure 2 are deteriorated. Moreover, zircon ($ZrSiO_4$) generated due to the sintering is extremely increased, and thus, the coefficient of linear thermal expansion at 20 to 1,000° C. of the sintered body, that is, the first ceramic structure 2 becomes small. As a result, there is a possibility that thermal expansion when heating the conduit constituting the conduit structure 1 for molten glass is inhibited, leading to breakage of the conduit.

The reason why the mass of the third particles is expressed in terms of silicon dioxide is that the glass particles are used as the third particles in some cases.

According to the slurry body, the mass ratio of the mass of the third particles in terms of silicon dioxide to the total mass of the first particles and the second particles (mass of the third particles in terms of silicon dioxide/(mass of the first particles+mass of the second particles)) is preferably 0.07 to 0.15, and more preferably 0.08 to 0.12.

In the case where a mass ratio of a mass of the third particles in terms of silicon dioxide to a mass of the first particles (mass of the third particles in terms of silicon dioxide/mass of the first particles) is 0.1 or more, when sintering the slurry body and immersing the slurry body in the molten glass of 1,450° C. or higher, the converting of the zirconium oxide into the zircon ($ZrSiO_4$) is sufficient, and the progress of the refining of the particles constituting the ceramic structure is sufficiently suppressed. As a result, it is preferable to further suppress the corrosion of the ceramic structure.

On the other hand, in the case where the mass ratio of the mass of the third particles in terms of silicon dioxide to the mass of the first particles (mass of the third particles in terms of silicon dioxide/mass of the first particles) is 0.9 or less, it is preferable that the compression strength and the corrosion resistance in the molten glass of the sintered body, that is, the first ceramic structure 2 are not deteriorated without preventing sintering between the first particles (zirconia particles).

According to the slurry body, the mass ratio of the mass of the third particles in terms of silicon dioxide to the mass of the first particles (mass of the third particles in terms of silicon dioxide/mass of the first particles) is preferably 0.15 to 0.6, and more preferably 0.25 to 0.45.

As described above, in the present invention, in order to form a slurry body by blending two kinds of zirconia particles (the first particles (zirconia particles) and the second particles (stabilized zirconia particles)), each having different median diameter D50, it is preferred that the first particles (zirconia particles) having small median diameter D50 are mixed in a ball mill together with ion-exchanged water, a pH regulator and an organic binder to be added as necessary, thereby forming a slurry precursor, and the slurry precursor is then mixed with the second particles (stabilized zirconia particles) having large median diameter D50 in a planetary mixer, thereby forming the slurry body. A step for mixing the third particles is selected depending on the median diameter D50. In a case where the median diameter D50 of the third particles is 1 to 10 μm, it is preferable to form a slurry precursor by mixing with the first particles. In a case where the median diameter D50 of the third particles is 10 to 500 μm, it is preferable to mix with the second particles.

However, a method for preparing the slurry body is not limited to the above method, and a method for mixing a powder or a slurry generally known can be used.

The reason that a pH regulator is used when preparing the slurry precursor in the above-described method for preparing the slurry body is that pH must be adjusted to weak alkalinity (about pH 7 to 9) for uniformly dispersing the first particles (zirconia particles) in ion-exchanged water.

CaO, ammonia, potassium carbonate and the like can be used as the pH regulator. Of those, CaO is preferably used for the reasons that CaO is easily handled and the amount of the residues after heating is small.

In the case where CaO is used as the pH regulator, the amount of CaO is preferably 0.01 to 0.2 wt %, more preferably 0.02 to 0.1 wt %, and still more preferably 0.03 to 0.05 , in terms of mass % to the entire composition of the slurry body.

As necessary, an organic binder is blended with the slurry body in order to improve handling property at ordinary temperature.

Methyl cellulose, liquid paraffin, polyethylene glycol and the like can be used as the organic binder. Examples of the organic binder having methyl cellulose as a component include METOLOSE, product name, manufactured by Shin-Etsu Chemical Co., Ltd.

The organic binder burns and flies apart when sintering the slurry body. Therefore, in the case where the blending amount of the organic binder is too large, the organic binder remains as carbon after burning.

For this reason, the blending amount of the organic binder is preferably 0.5 wt % or less, more preferably 0.3 wt % or less, and still more preferably 0.2 wt % or less, in terms of mass % to the entire composition of the slurry body.

The blending proportion of the first to third particles in the slurry body and ion-exchanged water is selected in the light of filling property of a slurry body, that is, filling property when a gap between the conduits (vertical pipe 1a and horizontal pipe 1b in FIG. 1, and conduit 1c in FIG. 2) constituting the conduit structure 1 for molten glass and the second ceramic structure 3 is filled with the slurry body, and handling property at ordinary temperature.

The blending proportion of the first to third particles in the slurry body and ion-exchanged water is preferably 4 to 20 wt %, more preferably 6 to 15 wt %, and still more preferably 8 to 12 wt %, in terms of mass % of the ion-exchanged water to the total mass of the first to third particles.

After filling the gap between the conduits (vertical pipe 1a and horizontal pipe 1b in FIG. 1, and conduit 1c in FIG. 2)

constituting the conduit structure 1 for molten glass and the second ceramic structure 3 with the slurry body, the slurry body is dried in air to remove the ion-exchanged water contained therein.

Thereafter, the slurry body is sintered at a temperature of 1,300 to 1,550° C. In the case where the temperature is lower than 1,300° C., the first particles (zirconia particles) and second particles (stabilized zirconia particles) contained in the slurry body are not sufficiently sintered. Converting the first particles (zirconia particles) and the third particles (silica particles or glass particles) into zircon ($ZrSiO_4$) does not progress. On the other hand, in a case where the temperature exceeds 1,550° C., the converting of the first particles (zirconia particles) and the third particles (silica particles or glass particles) into zircon ($ZrSiO_4$) does not progress.

The sintering temperature of the slurry body is preferably 1,350 to 1,500° C., and more preferably 1,400 to 1,450° C.

In the present invention, in order that the gap between the conduits (vertical pipe 1a and horizontal pipe 1b in FIG. 1, and conduit 1c in FIG. 2) constituting the conduit structure 1 for molten glass and the first ceramic structure 2 is less than 0.5 mm, dimensional change (shrinkage) of the slurry body when sintering is required to be small. Regarding this point, volume decreasing rate before and after sintering is preferably 10% or less, more preferably 7% or less, and still more preferably 4% or less. In other words, volume rate before and after sintering ((volume after heating/volume before heating)×100) is preferably 90% or more, more preferably 93% or more, and still more preferably 96% or more.

In the present invention, in order to suppress the deformation of the conduits constituting the conduit structure 1 for molten glass due to expansion pressure applied from molten glass, the sintered body is required to have sufficient compression strength in a temperature region when molten glass passes through the conduits.

Specifically, the compression strength of the sintered body at 1,400° C. is preferably 5 MPa or more, more preferably 8 MPa or more, and still more preferably 10 MPa or more.

In the present invention, the sintered body is required to have sufficient corrosion resistance to molten glass having a temperature of 1,450° C. or higher so as to prevent significant corrosion of the sintered body even though molten glass having an especially high temperature, in particular, molten glass having a temperature of 1,450° C. or higher is leaked from the conduit constituting the conduit structure 1 for molten glass for any reason.

As a result, in a case where an immersing test in the molten glass is carried out in the procedures of examples described hereinafter, the shape change rate of the sintered body before and after the test is preferably 10% or less, more preferably 5% or less, and still more preferably 3% or less.

The glass manufacturing apparatus of the present invention uses the molten glass conveying equipment element of the present invention as at least a part of flow passage of molten glass. Examples of the glass manufacturing apparatus of the present invention include a vacuum degassing apparatus using the glass manufacturing apparatus of the present invention as at least a part of flow passage of molten glass. The glass manufacturing apparatus of the present invention is not particularly limited so long as the molten glass conveying equipment element of the present invention is used as at least a part of flow passage of molten glass, and may be an apparatus containing a glass melting tank on the upstream side and a sheet glass forming equipment (for example, float bath) on the downstream side.

In the glass manufacturing apparatus of the present invention, it is preferable that the molten glass conveying equipment element of the present invention is used in a region through which the molten glass having an especially high temperature, in particular, the molten glass having a temperature of 1,450° C. or higher passes, among the flow passages of the molten glass.

Molten glass to be used in the present invention is preferably an alkali-free glass having a melting point about 100° C. higher than that of a soda-lime glass.

An alkali-free glass containing, as represented by mass percentage on the basis of oxides:
$SiO_2$: 50 to 73%,
$Al_2O_3$: 10.5 to 24%,
$B_2O_3$: 0 to 12%,
MgO: 0 to 10%,
CaO: 0 to 14.5%,
SrO: 0 to 24%,
BaO: 0 to 13.5%, and
$ZrO_2$: 0 to 5%,
provided that MgO+CaO+SrO+BaO is 8 to 29.5%.

In the case where a strain point is high and melting performance is considered, preferably an alkali-free glass containing, as represented by mass percentage on the basis of oxides:
$SiO_2$: 58 to 66%,
$Al_2O_3$: 15 to 22%,
$B_2O_3$: 5 to 12%,
MgO: 0 to 8%,
CaO: 0 to 9%,
SrO: 3 to 12.5%, and
BaO: 0 to 2%,
provided that MgO+CaO+SrO+BaO is 9 to 18%.

In the case of particularly considering melting performance, preferably an alkali-free glass containing, as represented by mass percentage on the basis of oxides:
$SiO_2$: 50 to 61.5%,
$Al_2O_3$: 10.5 to 18%,
$B_2O_3$: 7 to 10%,
MgO: 2 to 5%,
CaO: 0 to 14.5%,
SrO: 0 to 24%, and
BaO: 0 to 13.5%,
provided that MgO+CaO+SrO+BaO is 16 to 29.5%.

In the case of particularly considering high strain point, preferably an alkali-free glass containing, as represented by mass percentage on the basis of oxides:
$SiO_2$: 56 to 70%,
$Al_2O_3$: 14.5 to 22.5%,
$B_2O_3$: 0 to 3%,
MgO: 0 to 10%,
CaO: 0 to 9%,
SrO: 0 to 15.5%, and
BaO: 0 to 2.5%,
provided that MgO+CaO+SrO+BaO is 10 to 26%.

In the case of particularly considering high strain point and melting performance, preferably an alkali-free glass containing, as represented by mass percentage on the basis of oxides:
$SiO_2$: 54 to 73%,
$Al_2O_3$: 10.5 to 22.5%,
$B_2O_3$: 1.5 to 5.5%,
MgO: 0 to 10%,
CaO: 0 to 9%,
SrO: 0 to 16%, and
BaO: 0 to 2.5%,
provided that MgO+CaO+SrO+BaO is 8 to 25%.

An embodiment of a method for producing a glass article of the present invention is a method for producing a glass article in which a glass material is heated to obtain molten glass, and the molten glass is formed and annealed to obtain the glass article by using the above-described glass manufacturing apparatus containing molten glass conveying equipment element. The method for producing the glass article of the present invention is not particularly limited so long as the molten glass conveying equipment element of the present invention is used as at least a part of flow passage of molten glass. In the method for producing a glass article of the present invention, the above-described molten glass conveying equipment element is preferably used in a region through which the molten glass having an especially high temperature, in particular, the molten glass having a temperature of 1,450° C. or higher passes, among the flow passages of the molten glass.

<Melting Step>

For a method for melting a glass material, a known method for melting a glass material can be applied, and the method is not limited thereto. For example, in the melting of the glass material, a Siemens type or crucible type glass melting furnace is used.

Specifically, the glass material is added into the glass melting furnace, and is heated, and then the melting progress. As a result, molten glass is gradually obtained. In a case where the molten glass is present in the glass melting furnace, a glass material is added onto the liquid surface of the molten glass, and an agglomerated glass material (also called "batch pile") is heated and melted by using a burner or the like.

In a case where a large amount of glass is manufactured by large equipment, a batch material and cullet obtained by crushing a glass plate or the like may be mixed and added therein as a glass material.

In the melting step, the above-described molten glass conveying equipment element of the present invention can be used in a region in which the molten glass is transferred to a step of performing clarification of the molten glass or regulating the temperature of the molten glass. The above-described molten glass conveying equipment element of the present invention can be used in a region in which the molten glass is transferred to a vacuum device or is discharged from a vacuum device when the clarification of the molten glass is performed using a vacuum degassing device.

Moreover, the above-described molten glass conveying equipment element of the present invention can be used in a region in which the molten glass is transferred to a forming step.

<Forming Step and Annealing Step>

Figure 3:
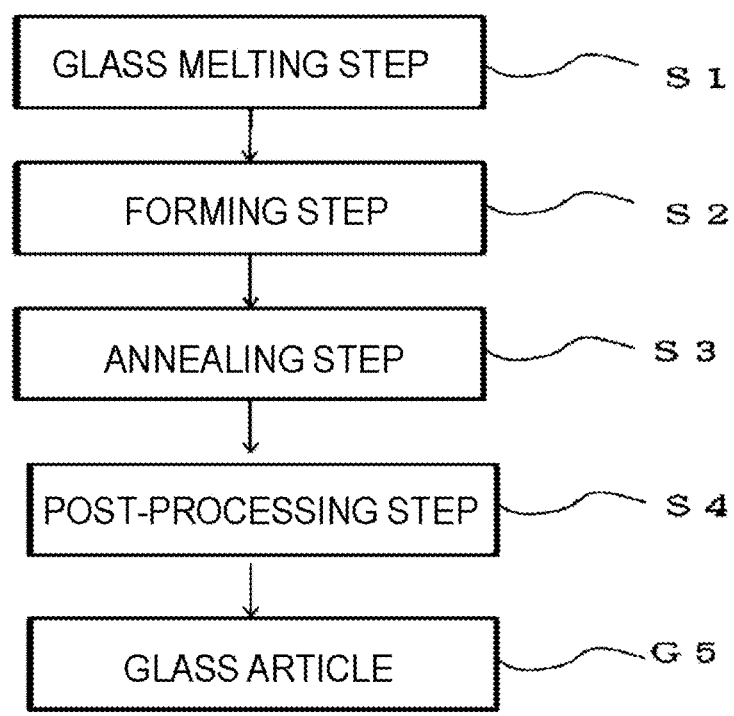
FIG. 3 is a flow chart showing an example of a method for producing a glass article of the present invention.
Figure 4:
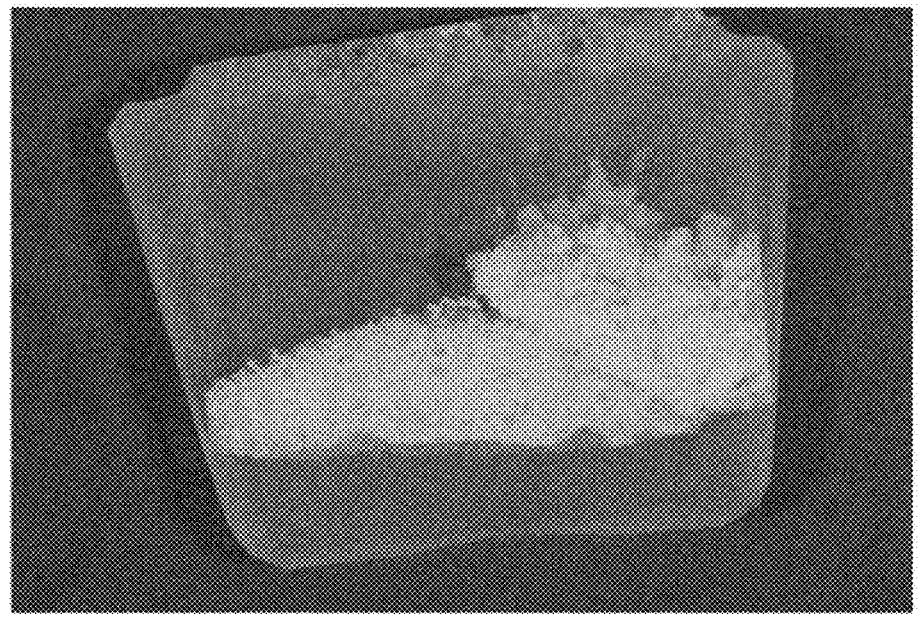
FIG. 4 is a photograph showing a cross section in Example 1 after glass corrosion resistance evaluation.
Figure 5:
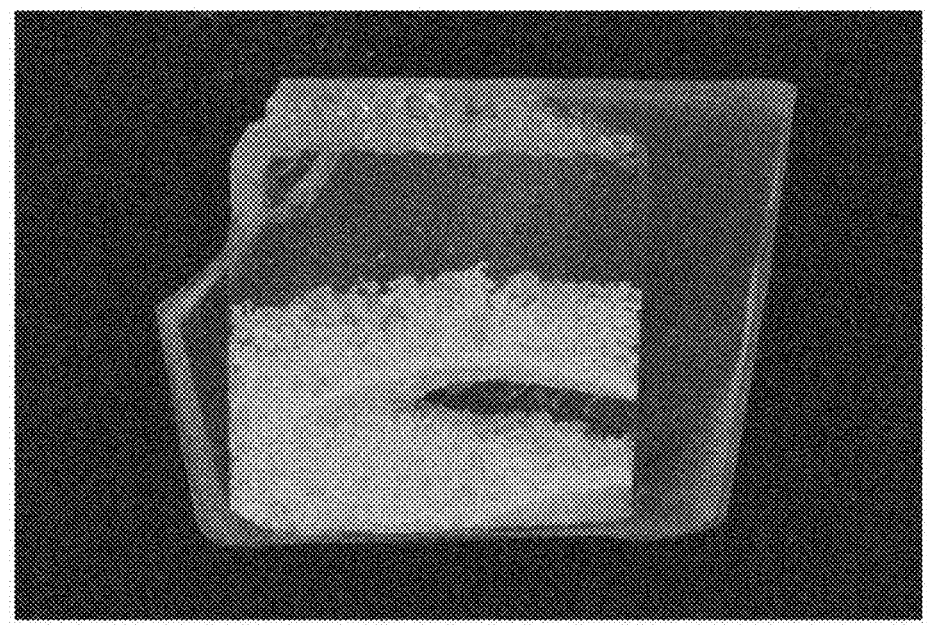
FIG. 5 is a photograph showing a cross section in Example 2 after glass corrosion resistance evaluation.
Figure 6:
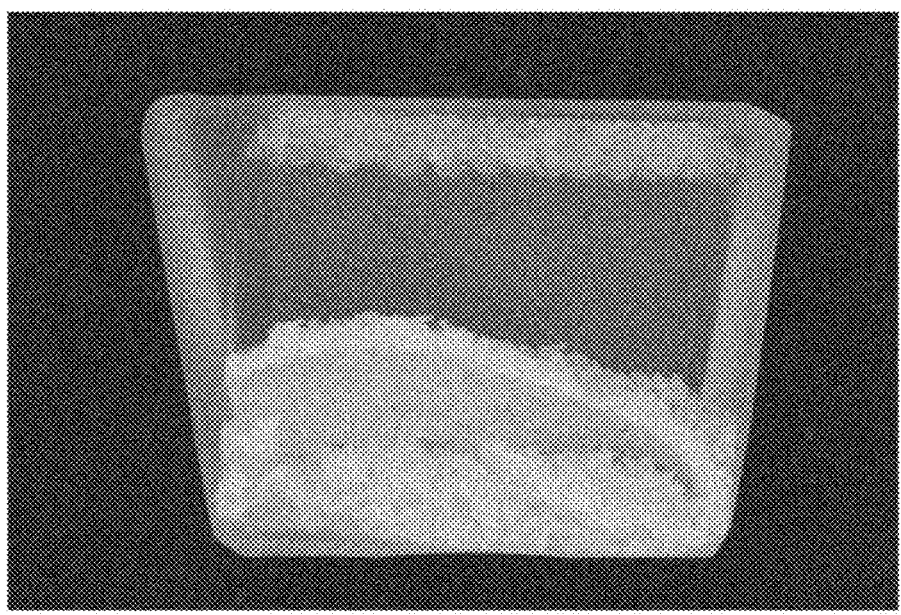
FIG. 6 is a photograph showing a cross section in Example 3 after glass corrosion resistance evaluation.
Figure 7:
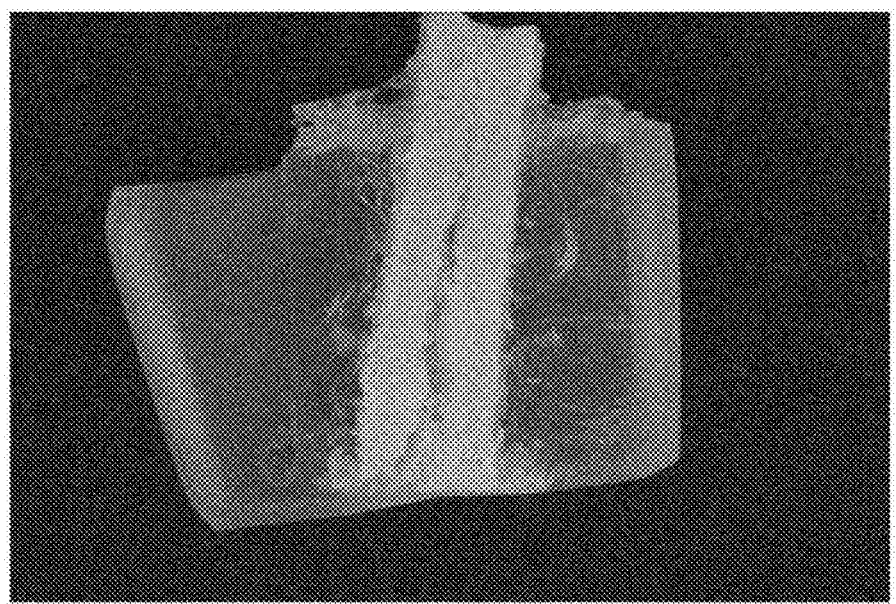
FIG. 7 is a photograph showing a cross section in Example 4 after glass corrosion resistance evaluation.
Figure 8:
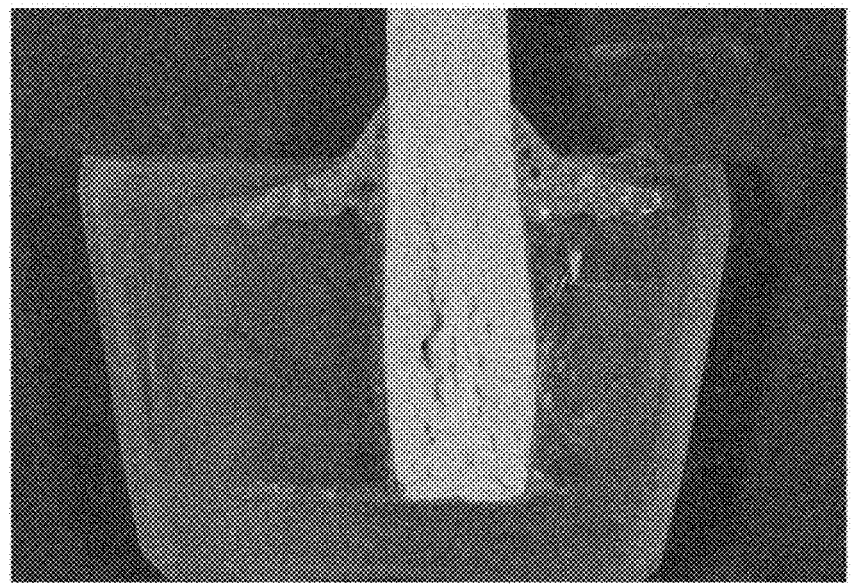
FIG. 8 is a photograph showing a cross section in Example 5 after glass corrosion resistance evaluation.
Figure 9:
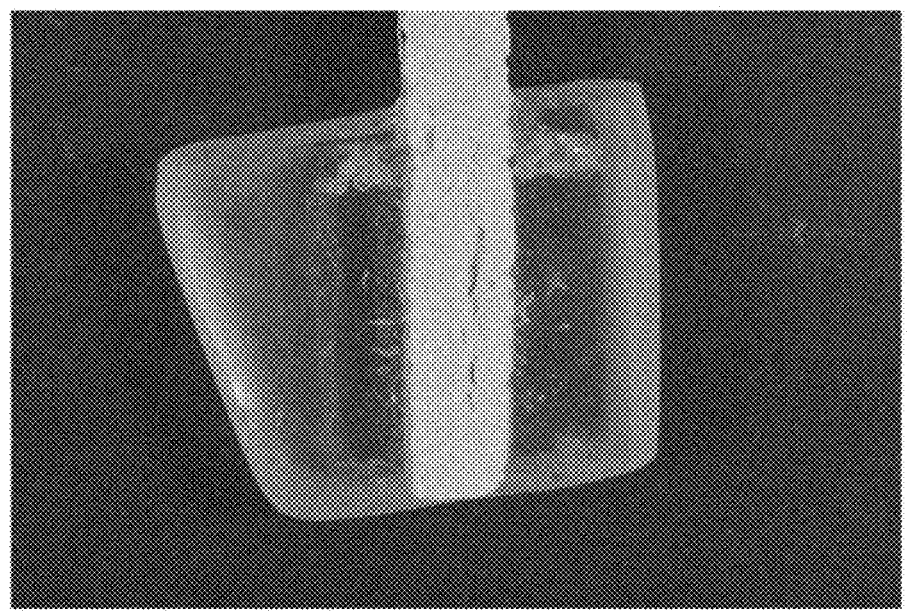
FIG. 9 is a photograph showing a cross section in Example 6 after glass corrosion resistance evaluation.
Figure 10:
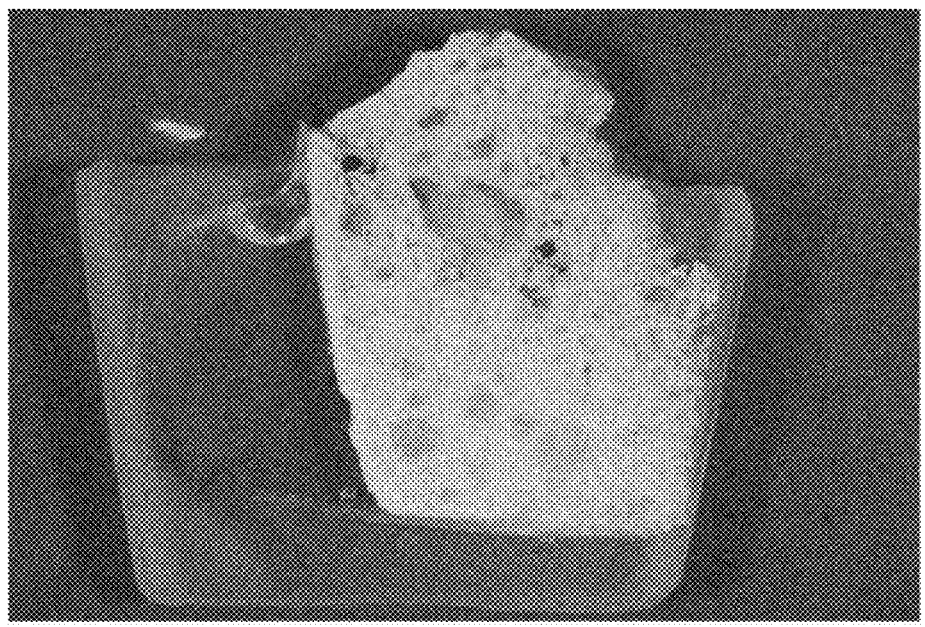
FIG. 10 is a photograph showing a cross section in Example 7 after glass corrosion resistance evaluation.
Figure 11:
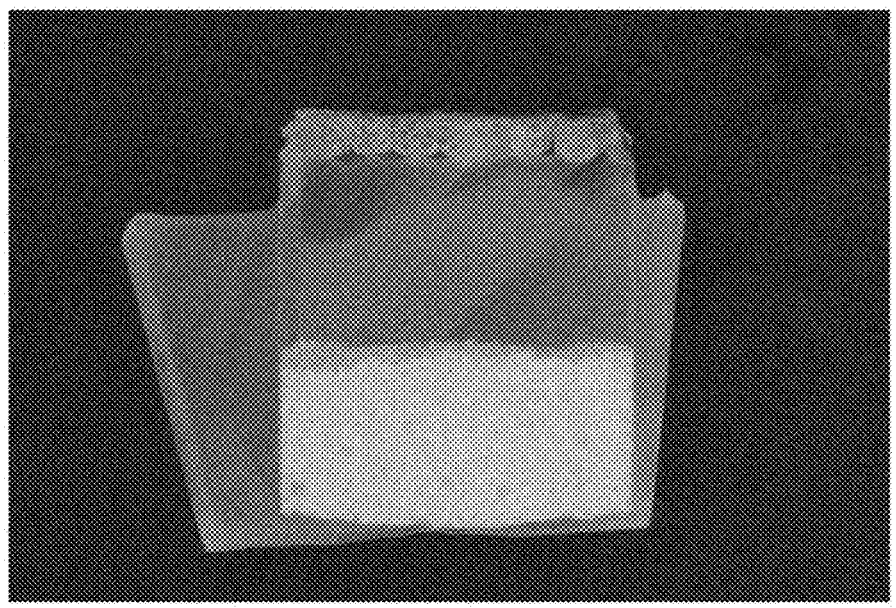
FIG. 11 is a photograph showing a cross section in Example 8 after glass corrosion resistance evaluation.
Figure 12:
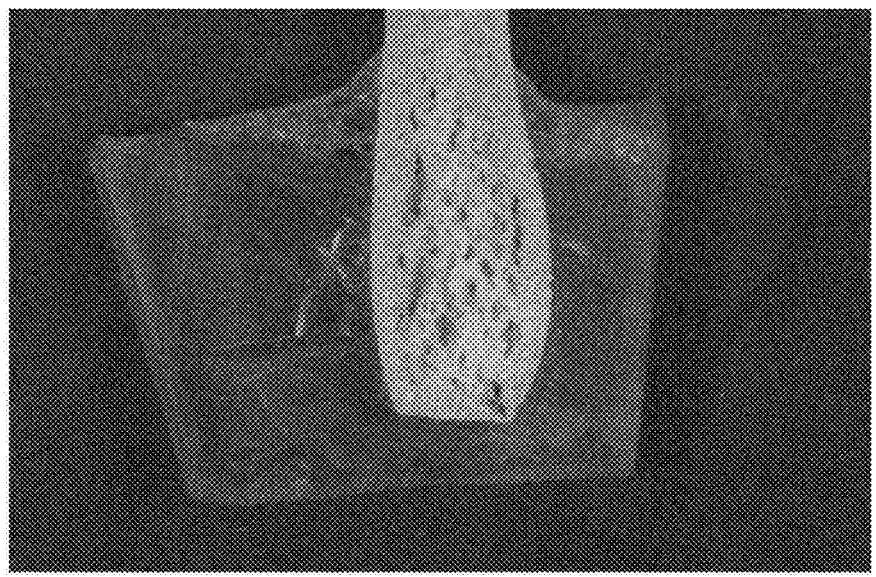
FIG. 12 is a photograph showing a cross section in Example 9 after glass corrosion resistance evaluation.
Figure 13:
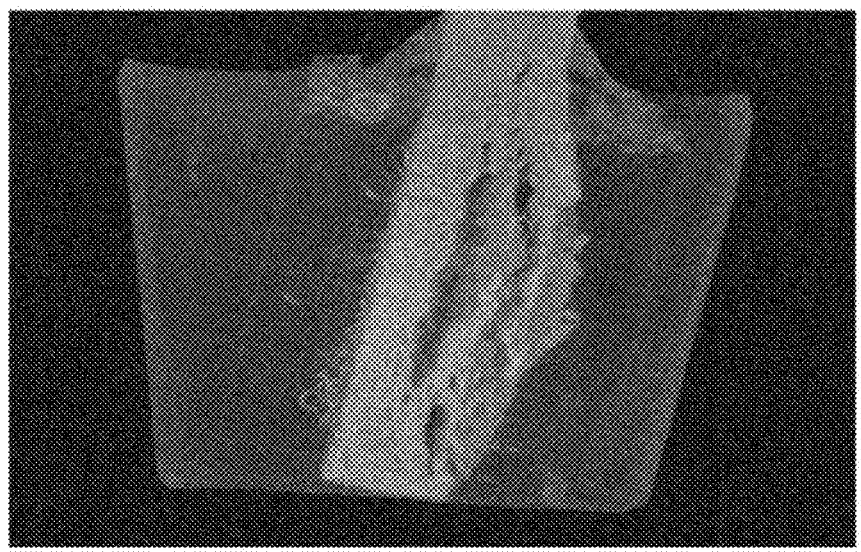
FIG. 13 is a photograph showing a cross section in Example 10 after glass corrosion resistance evaluation.
Figure 14:
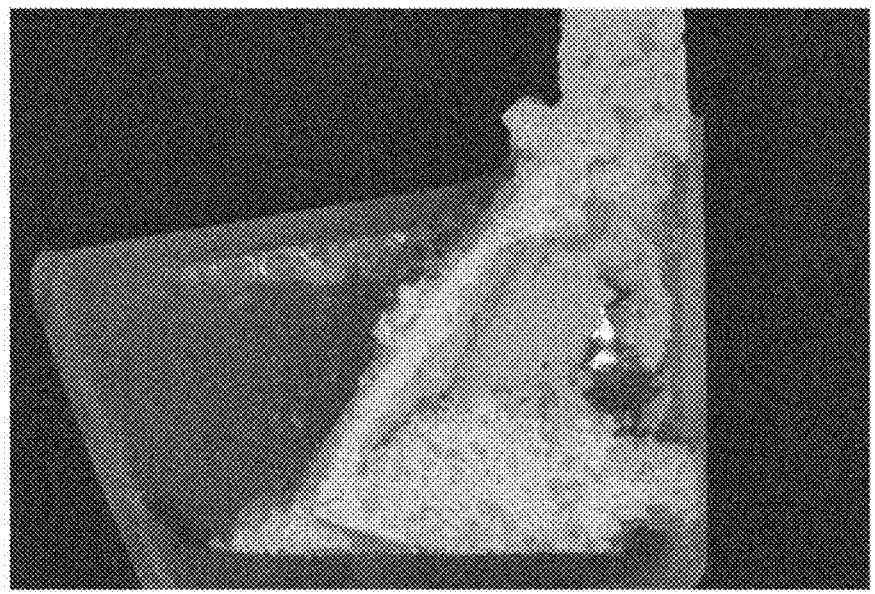
FIG. 14 is a photograph showing a cross section in Example 11 after glass corrosion resistance evaluation.
Figure 15:
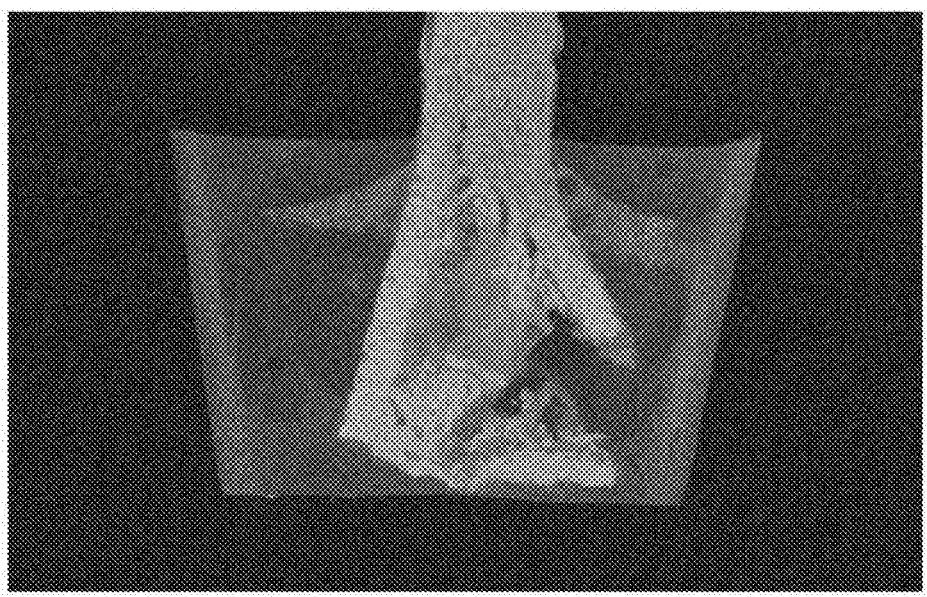
FIG. 15 is a photograph showing a cross section in Example 12 after glass corrosion resistance evaluation.
Figure 16:
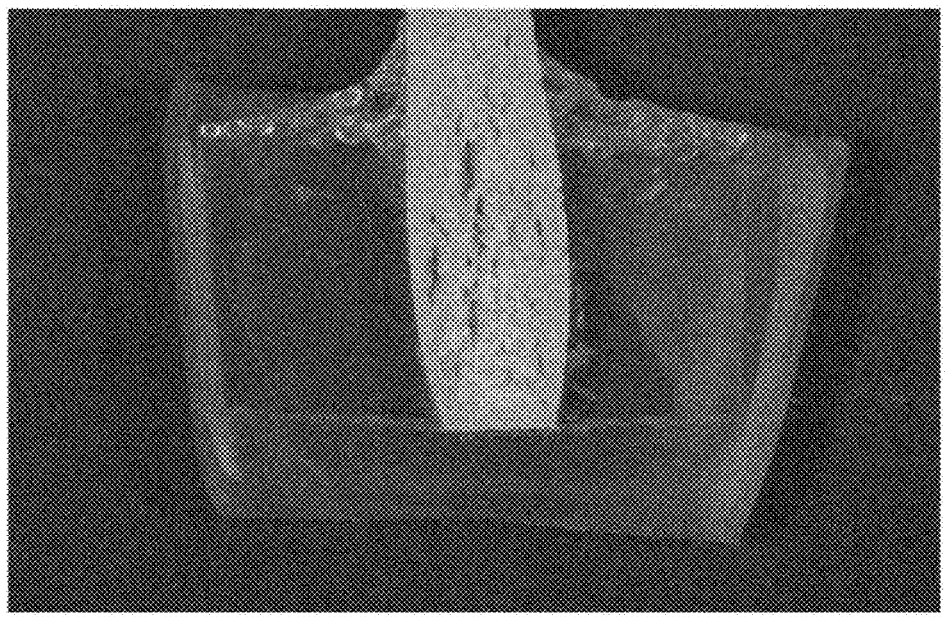
FIG. 16 is a photograph showing a cross section in Example 13 after glass corrosion resistance evaluation.
Figure 17:
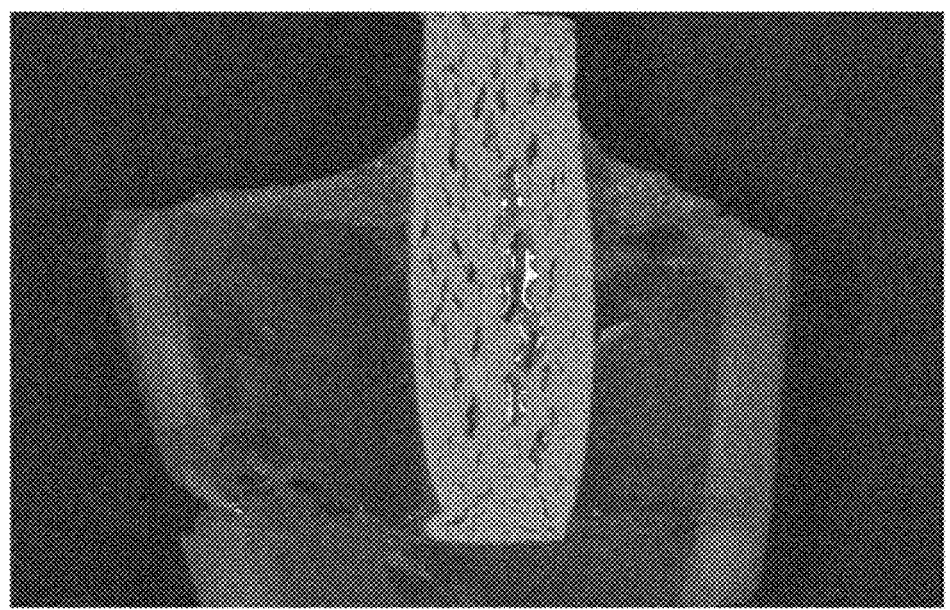
FIG. 17 is a photograph showing a cross section in Example 14 after glass corrosion resistance evaluation.
Figure 18:
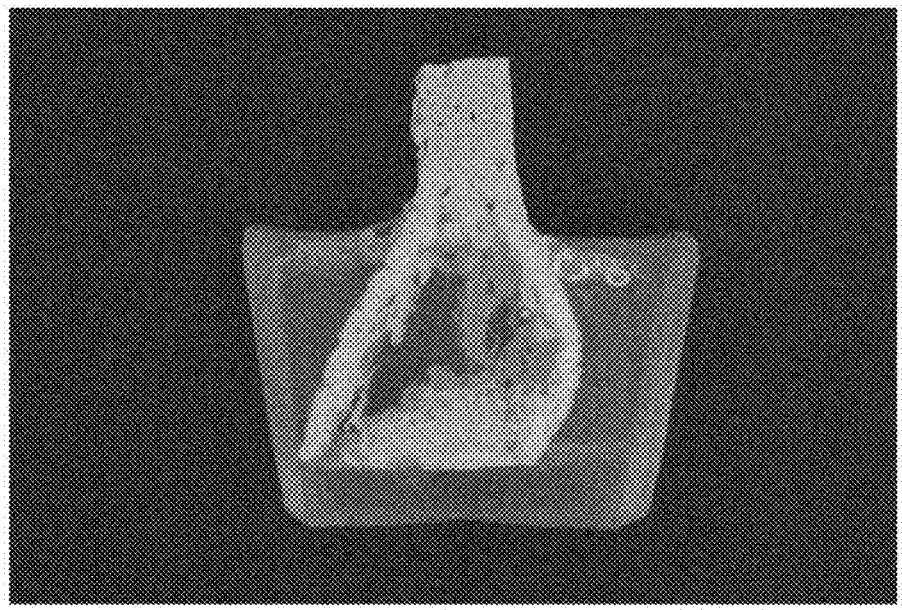
FIG. 18 is a photograph showing a cross section in Example 15 after glass corrosion resistance evaluation.
Figure 19:
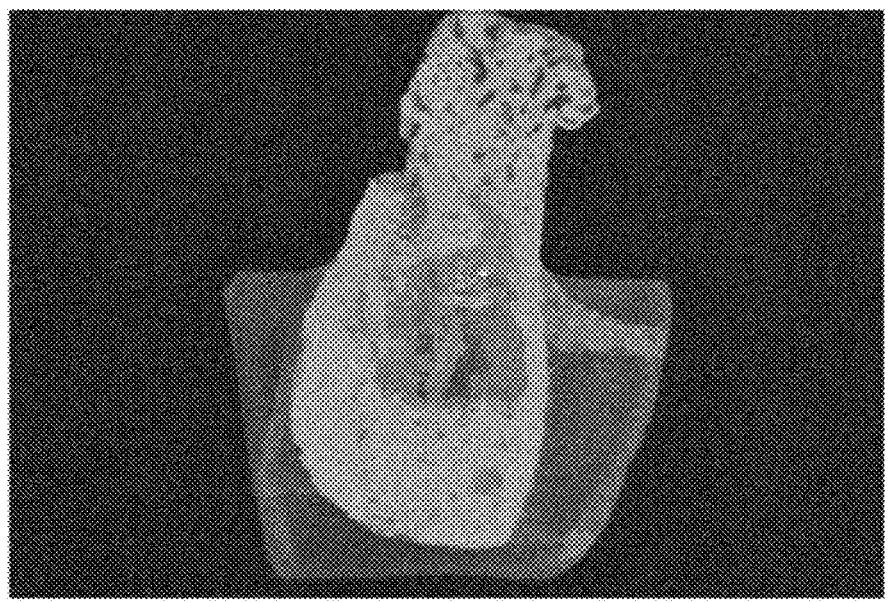
FIG. 19 is a photograph showing a cross section in Example 16 after glass corrosion resistance evaluation.
Figure 20:
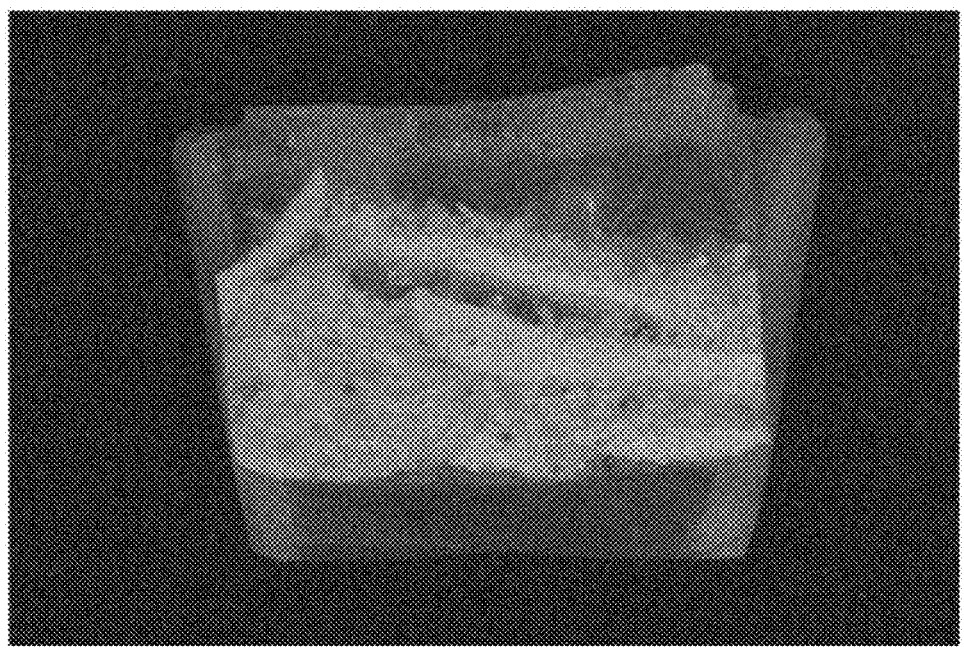
FIG. 20 is a photograph showing a cross section in Example 17 after glass corrosion resistance evaluation.

FIG. 3 is a flow chart showing an example of a method for producing a glass article of the present invention. A reference sign S1 represents a glass melting step.

Firstly, the molten glass obtained in the glass melting step S1 is formed into an intended shape in a forming step S2, and then annealed in an annealing step S3. Thereafter, as necessary, post-processing such as cutting or polishing is carried out by a known method to obtain a glass article G5 in a post-processing step S4.

In a case where the glass article is a sheet-shaped article, the forming step S2 can be performed by a known method such as a float method, a down-draw method, and a fusion method. The float method is a method for forming molten glass into a sheet-shape on a molten tin. The annealing step S3 also can be performed by a known method. By using the method for producing the glass article of the present invention, prevention of the occurrence of cracks of a conduit or prevention of deformation of a conduit due to expansion pressure applied from molten glass can be achieved, and a ceramic structure that is difficult to be corroded can be obtained even though molten glass is leaked for any reason, and thus, a glass article can be stably obtained with good quality.

<Glass Article>

The glass article manufactured by the method of the present invention is preferably a glass article made of molten glass having the above-described compositions.

The glass article of the present invention is preferably a sheet-shaped glass article. The sheet-shaped glass article is used for a display substrate.

EXAMPLES

Examples 1 to 8

In the following, Examples 4 to 6 are working examples, and Examples 1 to 3, and Examples 7 and 8 are comparative examples.

Fully stabilized zirconia particles F1 having a median diameter D50 of 4.3 μm, and ordinary zirconia particles F2 and F3 having a median diameter D50 of 4.1 μm and 31 μm, respectively, were prepared as first particles. Of those particles, particles F1 and F2 satisfy the median diameter D50 of the first particles (zirconia particles) in the present invention. On the other hand, the particles F1 contain 16.5 wt % of yttrium oxide as a stabilizer. The content of zirconium oxide was 82 wt %, and therefore the particles do not satisfy 90 wt % or more of zirconium oxide of the first particles (zirconia particles) in the present invention. The particles F2 contain 99.5% of zirconium oxide, and satisfy 90 wt % or more of zirconium oxide of the first particles (zirconia particles) in the present invention. The particles F3 do not satisfy the diameter D50 of the first particles (zirconia particles) in the present invention, but the content of the zirconium oxide was 98 wt %, and therefore, the particles satisfy 90 wt % or more of zirconium oxide of the first particles (zirconia particles) in the present invention.

Particles F1, F2 and F3: 76.85%, ion-exchanged water: 23%, CaO (pH regulator): 0.05%, and METOLOSE (organic binder, manufactured by Shin-Etsu Chemical Co., Ltd.): 0.1%, in mass ratio were blended, and the resulting blend was mixed in a ball mill for 3 hours using zirconia-made pot and balls, thereby preparing a slurry precursor.

Fully stabilized zirconia particles C having a median diameter D50 of 0.42 mm were prepared as second particles. The particles C satisfy the median diameter D50 of the second particles (stabilized zirconia particles) in the present invention. The particles C contain 8 wt % of yttrium oxide as a stabilizer. The content of zirconium oxide was 90 wt %, and the proportion of cubic zirconia in the zirconium oxide was 95 wt %. The particles satisfy 75 wt % or more of the zirconium oxide of the second particles (stabilized zirconia particles), 80 wt % or more of the proportion of cubic zirconia in the zirconium oxide, and 6 to 25 wt % of yttrium oxide in the present invention.

Glass particles G1 having a median diameter D50 of 0.2 mm and silica particles G2 having a median diameter D50 of 24 μm were prepared as third particles. The particles G1 and G2 satisfy the median diameter D50 of the third particles in the present invention.

The particles G1 contain 59.5 wt % of silicon dioxide, and the particles G2 contain 99.5 wt % of silicon dioxide. The particles satisfy 50 wt % or more of silicon dioxide of the third particles in the present invention.

The slurry precursor obtained by the above procedures was mixed with the second particles and the third particles for 20 minutes using a planetary mixer so that first particles/second particles in mass ratio was 0.43, and third particles/first particles in mass ratio and a mass ratio of the mass of the third particles in terms of silicon dioxide to the total mass of the first particles and the second particles (third particles/(first particles+second particles)) were values shown in Table 1, and then a slurry body was obtained.

A cylindrical mold having an inner diameter of 25 mm and a height of 30 mm was filled with the slurry bodies prepared by the above procedures in Examples 1 to 8, dried (Evaluation of Shrinkage Rate when Sintering Slurry Body)

An evaluation of shrinkage rate was carried out as a volume decreasing rate when sintering the slurry body in the following procedures. A length L of the long side of the dried rod-like samples prepared in the above-described procedures was measured. Each rod-like sample was maintained in the atmosphere at 1,500° C. for 10 hours, and a length L' of the long side thereof was measured. According to the slurry bodies in Examples 1 to 8, shrinkage rate (%) was obtained by Equation $\{1-(L'/L)^3\}\times 100$ based on theses L, and L'.

TABLE 1

| | First particles | Second particles | Third particles | Mass ratio First particles/Second particles | Mass ratio Third particles/First particles | Mass ratio Third particles/(First particles + Second particles) | Compression strength at 1,400° C. (MPa) |
|---|---|---|---|---|---|---|---|
| Example 1 | F1 | C | — | 0.43 | 0 | 0 | 10.5 |
| Example 2 | F1 | C | G1 | 0.43 | 0.33 | 0.1 | 12.1 |
| Example 3 | F1 | C | G2 | 0.43 | 0.33 | 0.1 | 14.6 |
| Example 4 | F2 | C | G1 | 0.43 | 0.33 | 0.1 | 13.9 |
| Example 5 | F2 | C | G2 | 0.43 | 0.16 | 0.05 | 14.2 |
| Example 6 | F2 | C | G2 | 0.43 | 0.33 | 0.1 | 19.2 |
| Example 7 | F2 | C | G2 | 0.43 | 1.00 | 0.3 | 4.8 |
| Example 8 | F3 | C | G2 | 0.43 | 0.33 | 0.1 | 2.1 | in the atmosphere for 10 hours, and then dried for 24 hours using a thermostat chamber heated to 80° C. After drying, the mold was removed to obtain the respective columnar samples. Each columnar sample was maintained in the atmosphere at 1,400° C. for 10 hours to sinter the slurry body, and then compression strength (MPa) in the atmosphere at 1,400° C. was measured in accordance with the following procedures.

(Measurement Method of Compression Strength)

Compression strength was measured by compressing a columnar sample in a furnace (air atmosphere) through an alumina jig using a portal universal tester (manufactured by Shimadzu Corporation; Autograph). Moving speed of a crosshead was 0.5 mm/min, and the maximum load was defined as compression strength. The results obtained by those measurements are shown in the Table 1 below.

(Evaluation of Glass Corrosion Resistance)

A mold having a length of 100 mm, a width of 20 mm, and a height of 10 mm was filled with the slurry bodies prepared by the above procedures in Examples 1 to 8, dried in the atmosphere for 10 hours, and then dried for 24 hours using a thermostat chamber heated to 80° C. After drying, the mold was maintained in the atmosphere at 1,500° C. for 10 hours to sinter the slurry body, and then, rod-like samples were obtained. Each rod-like sample was erected in the center of a platinum crucible having 300 cc, the surrounding area thereof was filled with glass, and then the product was maintained in the atmosphere at 1,500° C. for 100 hours. Thereafter, the rod-like sample was annealed to room temperature, bored by a core drill, cut in half lengthwise, and then the cross-section thereof was observed. According this evaluation, a material which is able to maintain the rod-like shape is determined as having high corrosion resistance to glass.

On the other hand, a material in which zirconia particles are accumulated at the bottom due to the collapse of the shape is determined as having poor corrosion resistance to glass. FIGS. 4 to 11 are photographs showing a cross section in Examples 1 to 8 after glass corrosion resistance evaluation.

As shown in Table, in all of Examples 2 to 6 in which the particles F1 and F2 satisfying D50 of the present invention were used as the first particles, and the mass ratio of the mass of the third particles in terms of silicon dioxide to the total mass of the first particles and the second particles (third particles/(first particles+second particles)) satisfied 0.05 to 0.2, the compression strength at 1,400° C. was 10 MPa or more.

On the other hand, in Example 7 in which the mass ratio (third particles/(first particles+second particles)) was larger than 0.2, the compression strength at 1,400° C. was as low as 4.8 MPa.

In addition, in Example 8 in which the particles F3 in which the D50 of the first particles was larger than 10 pin were used, the compression strength at 1,400° C. was as low as 2.1 MPa.

In Examples 4 to 6 (FIGS. 7 to 9) in which the particles F2 satisfying D50 of the present invention and having zirconium oxide in a content of 90% or more were used as the first particles, the mass ratio of the mass of the third particles in terms of silicon dioxide to the total mass of the first particles and the second particles (third particles/(first particles+second particles)) satisfied 0.05 to 0.2, the corrosion resistance to molten glass at 1,500° C. was high.

On the other hand, in Examples 1 to 3 (FIGS. 4 to 6) in which the particles F1 having zirconium oxide in a content of lower than 90% were used as the first particles, the original shape of the sample was not retained, and the corrosion resistance to molten glass at 1,500° C. was low.

In addition, in Example 7 (FIG. 10) in which the mass ratio (third particles/(first particles+second particles)) was larger than 0.2, the corrosion resistance to molten glass at 1,500° C. was low.

In addition, in Example 8 (FIG. 11) in which the particles F3 in which the D50 of the first particles was larger than 10 μm, the corrosion resistance to molten glass at 1,500° C. was low.

Moreover, according to the measurement results of shrinkage rate (%) in Examples 1 to 8, Example 1 was 0.6, Example 2 was 3.3, Example 3 was 2.1, Example 4 was 3.8, Example 5 was 2.7, Example 6 was 3.6, Example 7 was 6.2, and Example 8 was 1.2.

Examples 9 to 17

In the following, Examples 9, 10, 13, 14 are working examples and Examples 11, 12, and 15 to 17 are comparative examples.

Ordinary zirconia particles F2 having a median diameter D50 of 4.1 µm, were prepared as first particles. As described above, the zirconia particles F2 satisfy the condition of the first particles according to the present invention.

Particles F2: 76.85%, ion-exchanged water: 23%, CaO (pH regulator): 0.05%, and METOLOSE (organic binder, manufactured by Shin-Etsu Chemical Co., Ltd.): 0.1%, in mass ratio were blended, and the resulting blend was mixed in a ball mill for 3 hours using zirconia-made pot and balls, thereby preparing a slurry precursor.

Fully stabilized zirconia particles C, D, E, F, and G having a median diameter D50 of 0.42 mm, 0.28 mm, 1.65 mm, 0.11 mm, and 3.00 mm, respectively, were prepared as second particles. Of those particles, particles C, D, and E satisfy the median diameter D50 of the second particles in the present invention. In the particles C, D, E, F, and G, 8 wt % of yttrium oxide was contained as a stabilizer, the content of zirconium oxide was 90 wt %, and the proportion of cubic zirconia in the zirconium oxide was 95 wt %. Therefore, the particles satisfy the condition of the second particles according to the present invention.

Silica particles G2 having a median diameter D50 of 24 µm were prepared as third particles. As described above, the particles G2 satisfy the condition of the third particles according to the present invention.

The slurry precursor obtained by the above procedures was mixed with the second particles and the third particles for 20 minutes using a planetary mixer so that first particles/second particles in mass ratio, third particles/first particles in mass ratio, and the mass ratio of the mass of the third particles in terms of silicon dioxide to the total mass of the first particles and the second particles (third particles/(first particles+second particles)) were values shown in Table 2, and then a slurry body was obtained.

The slurry body prepared by the above procedures in Examples 9 to 17, evaluations of the compression strength, the glass corrosion resistance and the shrinkage rate were performed by the same method as that of Examples 1 to 8. FIGS. 12 to 20 are photographs showing a cross section in Examples 9 to 17 after glass corrosion resistance evaluation.

As shown in Table, in all of Examples 9 to 11, and 13 to 15 in which the particles F2 satisfying D50 of the present invention were used as the first particles, and the mass ratio of the mass of the third particles in terms of silicon dioxide to the total mass of the first particles and the second particles (third particles/(first particles+second particles)) satisfied 0.05 to 0.2, the compression strength at 1,400° C. was 10 MPa or more.

On the other hand, in Example 12 in which the mass ratio (first particles/second particles) was smaller than 0.25, the compression strength at 1,400° C. was as low as 4.1 MPa.

In Examples 9, 10, 13, and 14 (FIGS. 12, 13, 16, and 17) in which the particles F2 satisfying D50 of the present invention and having zirconium oxide in a content of 90% or more were used as the first particles, and the mass ratio of the mass of the third particles in terms of silicon dioxide to the total mass of the first particles and the second particles (third particles/(first particles+second particles)) satisfied 0.05 to 0.2, the corrosion resistance to molten glass at 1,500° C. was high.

On the other hand, in Example 11 in which the mass ratio (first particles/second particles) was larger than 0.6, Example 12 (FIG. 15) in which the mass ratio (first particles/second particles) was smaller than 0.25, and Examples 15 and 16 (FIGS. 18 and 19) not satisfying D50 of the second particles of the present invention, the corrosion resistance to molten glass at 1,500° C. was low.

In addition, in Example 17 (FIG. 20) not using the third particles, the corrosion resistance to molten glass at 1,500° C. was low.

Moreover, according to the shrinkage rate (%) in Examples 9 to 17, Example 9 was 5.6, Example 10 was 2.4, Example 11 was 12.9, Example 12 was 1.5, Example 13 was 8.4, Example 14 was 2.7, Example 15 was 7.0, Example 16 was 2.1, and Example 17 was 1.9. In Example 13, the value of the shrinkage rate was higher than those in the other Examples, but the value falls within the preferable range. The shrinkage rate in Example 11 became significantly higher than those in the other Examples.

While the present invention has been described in detail with reference to specific embodiments thereof, it will be apparent to one skilled in the art that various changes and modifications can be made therein without departing from the spirit and scope thereof.

The present application is based on Japanese Patent Application No. 2012-248210 filed on Nov. 12, 2012, the contents of which are incorporated herein by reference.

REFERENCE SIGNS LIST 1, 1a, 1b, 1c: Conduit
2: First Ceramic Structure
3: Second Ceramic Structure

TABLE 2

| | First particles | Second particles | Third particles | Mass ratio First particles/ Second particles | Mass ratio Third particles/ First particles | Mass ratio Third particles/ (First particles + Second particles) | Compression strength at 1,400° C. (MPa) |
|---|---|---|---|---|---|---|---|
| Example 9 | F2 | C | G2 | 0.5 | 0.3 | 0.1 | 20.4 |
| Example 10 | F2 | C | G2 | 0.3 | 0.43 | 0.1 | 10.9 |
| Example 11 | F2 | C | G2 | 0.7 | 0.24 | 0.1 | 24.8 |
| Example 12 | F2 | C | G2 | 0.2 | 0.6 | 0.1 | 4.1 |
| Example 13 | F2 | D | G2 | 0.43 | 0.33 | 0.1 | 18.2 |
| Example 14 | F2 | E | G2 | 0.43 | 0.33 | 0.1 | 11.2 |
| Example 15 | F2 | F | G2 | 0.43 | 0.33 | 0.1 | 23.6 |
| Example 16 | F2 | G | G2 | 0.43 | 0.33 | 0.1 | 5.5 |
| Example 17 | F2 | C | — | 0.43 | 0 | 0 | 11.6 |

The invention claimed is:

1. A method for producing a molten glass conveying equipment element having a conduit structure for molten glass containing at least one conduit comprising platinum or a platinum alloy, a first ceramic structure provided around the conduit and a second ceramic structure located around the first ceramic structure, the method comprising:

filling a gap between the conduit and the second ceramic structure with a slurry body, the slurry body being prepared by blending: first particles having a median diameter D50 of 0.2 to 10 μm and containing, in terms of mass % to an entire composition, 90 wt % or more of zirconium oxide; second particles having a median diameter D50 of 0.2 to 2 mm and containing, in terms of mass % to the entire composition, 75 wt % or more of zirconium oxide, in which a proportion of cubic zirconia in the zirconium oxide is 80 wt % or more, and containing at least one of stabilizers selected from the group consisting of yttrium oxide and cerium oxide in a total content of 6 to 25 wt %; and third particles having a median diameter D50 of 1 to 500 μm and containing, in terms of mass % to the entire composition, 50 wt % or more of silicon dioxide, so as to satisfy that a mass ratio of a mass of the first particles to a mass of the second particles (mass of the first particles/mass of the second particles) is 0.25 to 0.6, and a mass ratio of a mass of the third particles in terms of silicon dioxide to a total mass of the first particles and the second particles (mass of the third particles in terms of silicon dioxide/(mass of the first particles+mass of the second particles)) is 0.05 to 0.2; and sintering the slurry body at a temperature of 1,300 to 1,550° C., thereby forming the first ceramic structure.

2. The method for producing a molten glass conveying equipment element according to claim 1, wherein the gap between the conduit and the second ceramic structure is filled with the slurry body so as to satisfy that the mass ratio of the mass of the first particles to the mass of the second particles (mass of the first particles/mass of the second particles) is 0.3 to 0.6, a mass ratio of a mass of the third particles in terms of silicon dioxide to the mass of the first particles (mass of the third particles in terms of silicon dioxide/mass of the first particles) is 0.1 to 0.9.

3. The method for producing a molten glass conveying equipment element according to claim 1, wherein the third particles substantially consist of only the silicon dioxide.

4. The method for producing a molten glass conveying equipment element according to claim 2, wherein the third particles substantially consist of only the silicon dioxide.

5. The method for producing a molten glass conveying equipment element according to claim 3, wherein the median diameter D50 of the third particles is 10 to 300 μm.

6. The method for producing a molten glass conveying equipment element according to claim 4, wherein the median diameter D50 of the third particles is 10 to 300 μm.

7. The method for producing a molten glass conveying equipment element according to claim 1, wherein the third particles are glass particles which contain, in terms of mass % to the entire composition, 50 wt % or more of the silicon dioxide.

8. The method for producing a molten glass conveying equipment element according to claim 2, wherein the third particles are glass particles which contain, in terms of mass % to the entire composition, 50 wt % or more of the silicon dioxide.

9. The method for producing a molten glass conveying equipment element according to claim 7, wherein the median diameter D50 of the third particles is 20 to 100 μm.

10. The method for producing a molten glass conveying equipment element according to claim 8, wherein the median diameter D50 of the third particles is 20 to 100 μm.

11. The method for producing a molten glass conveying equipment element according to claim 1, wherein the conduit includes a conduit having at least one of a convex portion and a concave portion, which continues 360° in a circumferential direction.

12. The method for producing a molten glass conveying equipment element according to claim 2, wherein the conduit includes a conduit having at least one of a convex portion and a concave portion, which continues 360° in a circumferential direction.

13. The method for producing a molten glass conveying equipment element according to claim 1, wherein the conduit includes a conduit having a stirrer provided inside thereof.

14. The method for producing a molten glass conveying equipment element according to claim 2, wherein the conduit includes a conduit having a stirrer provided inside thereof.

15. The method for producing a molten glass conveying equipment element according to claim 1, wherein cumulative undersize 90% diameter (D90) of the first particles is 15 μm or less and cumulative undersize 10% diameter (D10) of the second particles is 0.1 mm or more.

16. The method for producing a molten glass conveying equipment element according to claim 2, wherein cumulative undersize 90% diameter (D90) of the first particles is 15 μm or less and cumulative undersize 10% diameter (D10) of the second particles is 0.1 mm or more.

17. A molten glass conveying equipment element having a conduit structure for molten glass containing at least one conduit comprising platinum or a platinum alloy, a first ceramic structure provided around the conduit and a second ceramic structure located around the first ceramic structure, wherein the first ceramic structure contains: in terms of mass % to an entire composition, 65 wt % or more of zirconium oxide, in which a proportion of cubic zirconia in the zirconium oxide is 60 wt % or more; and 1 to 20 wt % of zircon ($ZrSiO_4$), and an average open porosity of the first ceramic structure is 20 to 60%, a coefficient of linear thermal expansion at 20 to 1,000° C. of the first ceramic structure is $8 \times 10^{-6}$ to $12 \times 10^{-6}$/° C. and the gap between the conduit and the first ceramic structure is less than 0.5 mm.

18. The molten glass conveying equipment element according to claim 17, wherein a mass ratio of a total mass of yttrium oxide and cerium oxide to a mass of zirconium oxide contained in the first ceramic structure (total mass of yttrium oxide and cerium oxide/mass of zirconium oxide) is 0.05 to 0.25.

19. The molten glass conveying equipment element according to claim 18, wherein the mass ratio of the total mass of yttrium oxide and cerium oxide to the mass of zirconium oxide contained in the first ceramic structure (total mass of yttrium oxide and cerium oxide/mass of zirconium oxide) is 0.05 to 0.08.

20. The molten glass conveying equipment element according to claim 17, wherein compression strength at 1,400° C. of the first ceramic structure is 5 MPa or more.

21. The molten glass conveying equipment element according to claim 18, wherein compression strength at 1,400° C. of the first ceramic structure is 5 MPa or more.

22. The molten glass conveying equipment element according to claim 19, wherein compression strength at 1,400° C. of the first ceramic structure is 5 MPa or more.

23. A glass manufacturing apparatus, including the molten glass conveying equipment element according to claim 17.

24. A method for producing a glass article using the glass manufacturing apparatus according to claim 23, the method comprising:
  heating a glass material, thereby obtaining molten glass; and
  forming and annealing the molten glass, thereby obtaining the glass article.

* * * * *